United States Patent [19]
Lyons et al.

[11] Patent Number: 5,839,096
[45] Date of Patent: Nov. 17, 1998

[54] SELF-IMPLEMENTING DIAGNOSTIC SYSTEM

[75] Inventors: Christopher T. Lyons, Tyngsboro; Ismail Taskin, Arlington, both of Mass.

[73] Assignee: Hittite Microwave Corporation, Woburn, Mass.

[21] Appl. No.: 814,102

[22] Filed: Mar. 10, 1997

[51] Int. Cl.⁶ .................................................. G01S 7/40
[52] U.S. Cl. .................. 702/183; 702/189; 702/190; 342/165; 342/171; 342/173; 342/174; 342/175
[58] Field of Search ................................ 364/561; 701/1, 701/116, 117, 118, 119, 120, 300, 301; 342/41, 89, 104, 118, 147, 465, 171, 173, 174, 175; 395/180, 185.04, 185.08; 702/183, 182, 184, 185, 189, 190, 191

[56] References Cited

U.S. PATENT DOCUMENTS

| 3,750,171 | 7/1973 | Faris ............................................. 343/9 |
| 4,158,841 | 6/1979 | Wiichner et al. ............................ 343/7 |
| 4,729,247 | 3/1988 | Brown ..................................... 73/866.4 |
| 4,945,360 | 7/1990 | Trummer et al. ........................ 342/122 |
| 5,287,111 | 2/1994 | Shpater ...................................... 342/28 |
| 5,339,081 | 8/1994 | Jefferies et al. ............................ 342/28 |
| 5,402,129 | 3/1995 | Gellner et al. ............................. 342/70 |
| 5,412,414 | 5/1995 | Ast et al. .................................. 342/174 |
| 5,432,516 | 7/1995 | Cherry et al. .............................. 342/28 |
| 5,453,740 | 9/1995 | Gallaghet et al. ....................... 340/903 |
| 5,517,196 | 5/1996 | Pakett et al. ............................... 342/70 |
| 5,640,143 | 6/1997 | Myron et al. ............................ 340/541 |
| 5,696,515 | 12/1997 | Zyren et al. ............................. 342/104 |

*Primary Examiner*—John Barlow
*Assistant Examiner*—Patrick Assouad
*Attorney, Agent, or Firm*—Iandiorio & Teska

[57] ABSTRACT

A self-implementing, self-diagnostic system for an anticipatory collision sensor system includes a transducer device for transmitting a modulated carrier signal and receiving the reflected modulated carrier signal from an object; a detection device for detecting a plurality of Doppler shifted harmonic components from the reflected modulated carrier signal; a range determining device responsive to the amplitude of at least two of the harmonic components for determining the instantaneous range of the object; a velocity measurement device, responsive to the frequency of at least one of the harmonic components, for determining the relative, instantaneous velocity of the object; an indicating device, responsive to at least one of the modulated carrier signal, the reflected modulated carrier signal, the amplitude, and the frequency, to indicate the condition of the system.

21 Claims, 13 Drawing Sheets

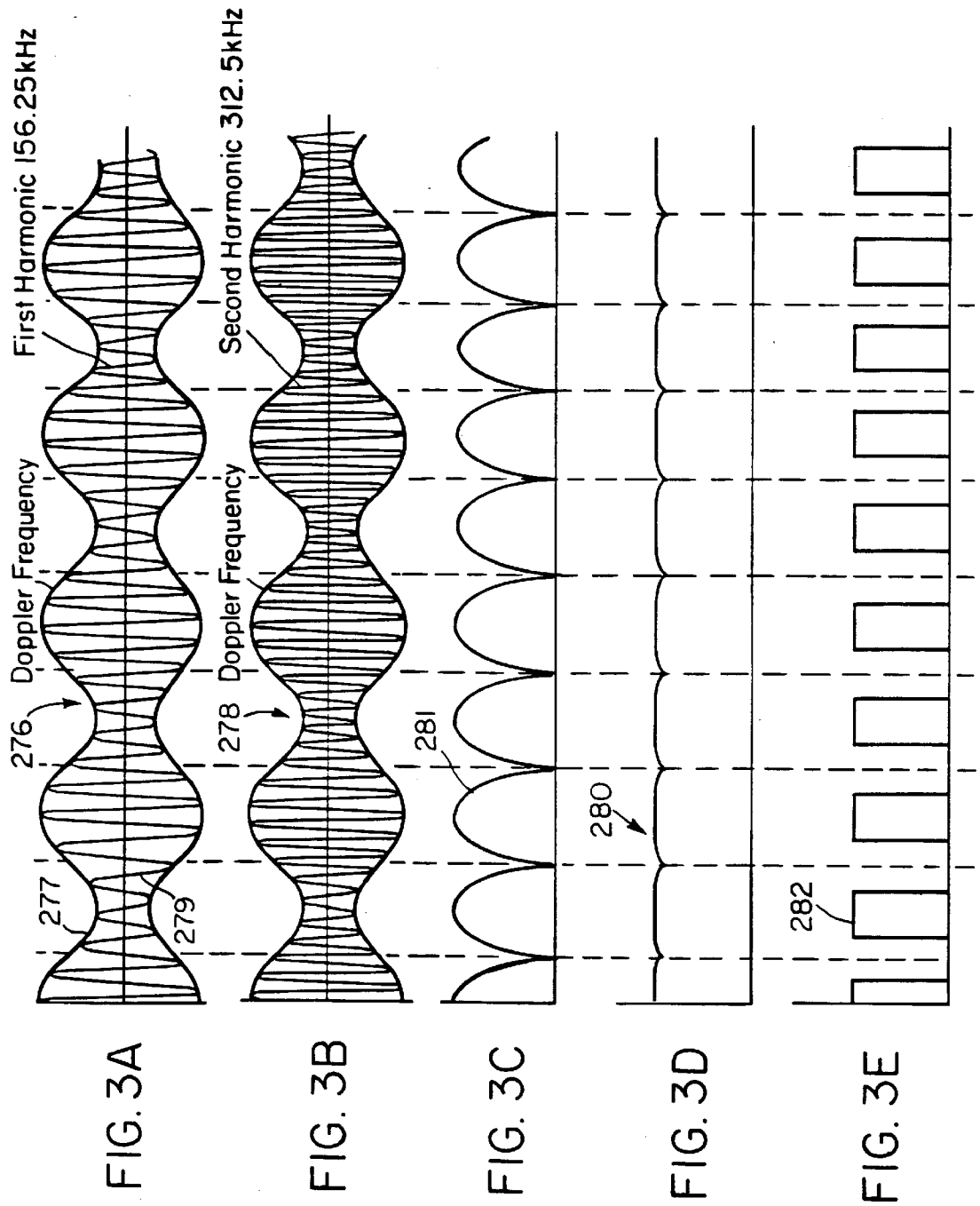

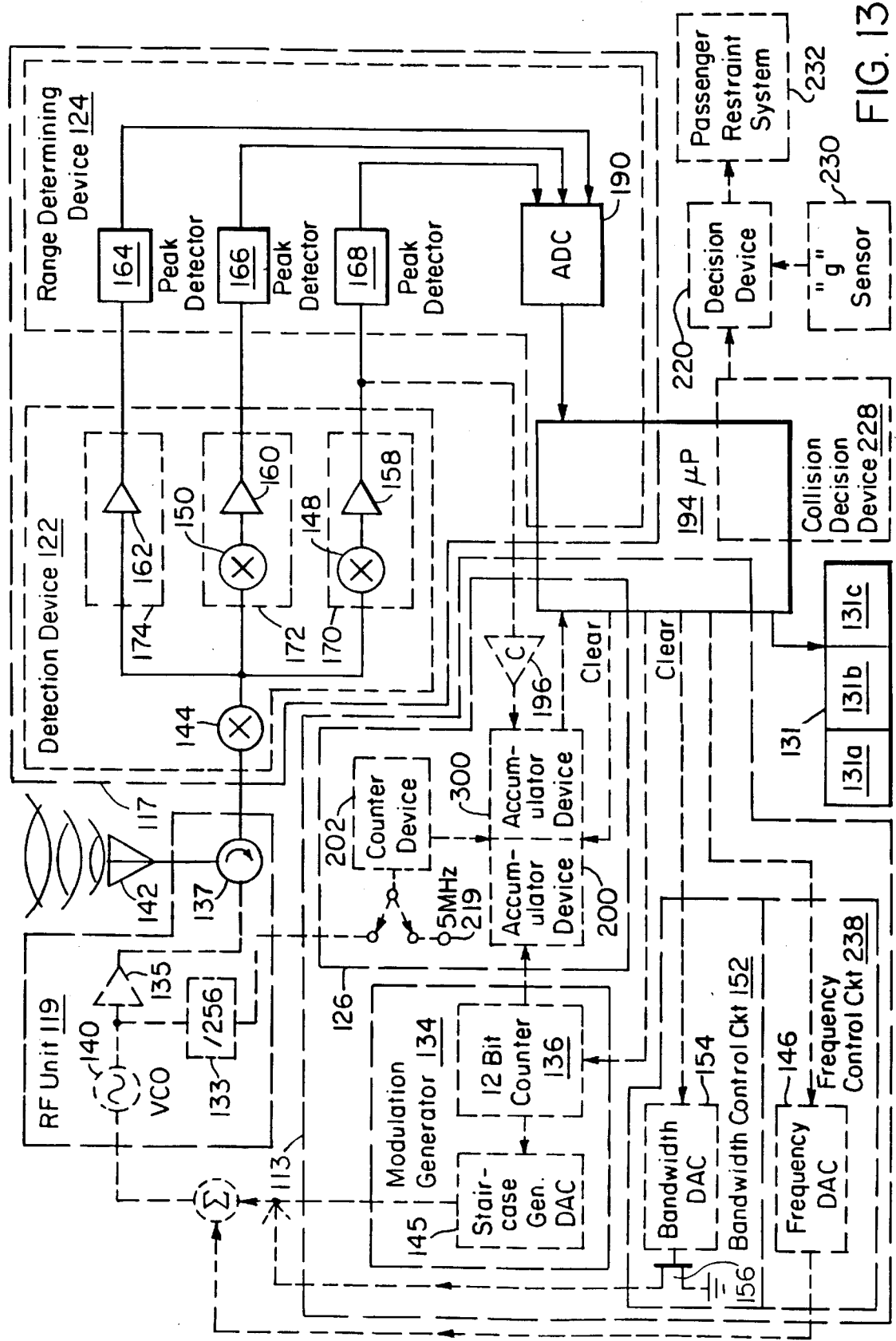

SELF-IMPLEMENTING DIAGNOSTIC SYSTEM

FIELD OF INVENTION

This invention relates to a diagnostic test system and more particularly to a self-implemented, self-diagnostic system for an anticipatory collision detection system.

RELATED CASES

U.S. patent application Ser. No. 08/796,290 entitled "ANTICIPATORY COLLISION SENSOR SYSTEM" by Lyons et al., filed Feb. 7, 1997;

U.S. patent application Ser. No. 08/798,651 entitled "DIGITAL SYNCHRONIZATION OF A BROADCAST FREQUENCY" by Lyons et al., filed Feb. 11, 1997; and U.S. patent application Ser. No. 08/808,939 entitled "MULTI-SENSOR ANTICIPATORY OBJECT DETECTION SYSTEM" by Lyons et al., filed Feb. 19, 1997.

BACKGROUND OF INVENTION

Air bags are used widely in passenger cars, light trucks and vans as auxiliary protection devices to seatbelts for increased driver and occupant protection in collision situations. The airbag was designed to enhance the protection offered by seatbelt systems, especially in higher speed front impact crashes where minor belt induced injuries and serious head and chest injuries can still occur to occupants restrained only by seatbelts.

Recent developments in pre-crash sensor technology has made it possible to detect a collision before actual impact with an object occurs. The use of microwave radar to detect a potential colliding object can prevent unnecessary deployment of the airbag in low speed crashes where an unbelted occupant will move closer to the airbag prior to inflation. However, in order for such a pre-crash sensor to be effective, it is necessary to ensure that the system is properly operating at all times. Thus, to yield maximum occupant protection it is critical that the pre-crash sensor is properly operating at all times and will send accurate data to the airbag deployment circuitry.

Existing diagnostic systems require additional hardware and inputs in order to verify that the system is working properly. This necessarily adds cost to the system as well as introducing additional components which may themselves be the cause of improper diagnostic test results. Further, such diagnostic testing requires interrupting the system in its normal operation. Even where the diagnostic system can be utilized while the automobile is in motion, a substantial interruption in operation leaves the automobile vulnerable to impact with an object which was not detected because the system was preoccupied with the diagnostic operation.

SUMMARY OF INVENTION

It is therefore an object of this invention to provide an improved self-implementing, self-diagnostic system for an anticipatory collision sensor system.

It is a further object of this invention to provide such a self-implementing, self-diagnostic system which requires no additional hardware or external connections.

It is a further object of this invention to provide such a self-implementing, self-diagnostic system which periodically tests the integrity of the system but does not interfere with the normal operation of the anticipatory collision sensor system.

It is a further object of this invention to provide such a self-implementing, self-diagnostic system which can be overridden if an object should suddenly be detected.

It is a further object of this invention to provide such a self-implementing, self-diagnostic system which is cost effective to manufacture and implement.

The invention results from the realization that a truly effective self-implementing, self-diagnostic system for an anticipatory collision sensor system for a vehicle can be achieved which requires no additional hardware or external connections and which can be implemented without interfering with the normal operation of the anticipatory collision sensor system by using available noise signals and modified system signals to check system functions through inference and operation.

The invention features a self-implementing, self-diagnostic system for an anticipatory collision sensor system for a vehicle including oscillator means for generating a carrier signal, a modulation generator for generating a modulation signal for modulating the carrier signal and means for selectively inhibiting the modulation signal to produce a synthetic Doppler shift. There is a mixer device for mixing the carrier signal and the modulation signal to produce a modulated carrier signal. There is a detection device, responsive to the synthetic Doppler shift, for detecting a synthetic Doppler signal induced by the means for inhibiting. There is a measuring device, responsive to the synthetic Doppler signal, for measuring the amplitudes of the synthetic Doppler signal. The measuring device includes counting means, responsive to the synthetic Doppler signal, for determining the frequency of the synthetic Doppler signal. There is first comparing means, responsive to the measuring means, for comparing the amplitudes to predetermined levels. There is second comparing means, responsive to the frequency of the synthetic Doppler signal, for comparing the frequency to a predetermined value and there is an indicating device, responsive to the first comparing means and the second comparing means, for indicating the operational status of the anticipatory collision sensor system.

In a preferred embodiment the indicating device may include first indicating means, responsive to the modulated carrier signal, for indicating the operational status of the mixer device. The detection device may include a plurality of channels for detecting the synthetic Doppler signal, each channel including amplifier means for amplifying the synthetic Doppler signal. Each channel may further include mixing means for producing a demodulated carrier signal. Each channel may further include detector means for detecting the peak amplitude of the synthetic Doppler signal to produce a DC voltage signal for the synthetic Doppler signal. The range determining device may include an analog to digital convertor for converting the DC voltage signal to a digital signal. The measuring device may include a comparator device, responsive to the synthetic Doppler signal, for providing a Doppler pulse each time the amplitude of the synthetic Doppler signal exceeds a predetermined level.

The invention also features a self-implementing, self-diagnostic system for an anticipatory collision sensor system for a vehicle including a voltage controlled oscillator for generating a carrier signal to be modulated having a predetermined frequency and bandwidth, an adjustment device including a center frequency adjustment circuit for providing a voltage level to the voltage controlled oscillator, a modulation generator for generating a modulation signal for modulating the carrier signal to produce a modulated carrier signal and a measurement signal synchronized with the modulation signal. There is means for selectively minimizing the modulation signal for minimizing the bandwidth. There is a measurement device including a counter device for selectively counting the pulses of the modulated carrier signal for a first predetermined period of time and counting the pulses of the carrier signal for a second predetermined period of time while the modulation signal is minimized and including a measurement circuit responsive to the measurement signal for defining the first predetermined period of time during which the modulated carrier pulses are counted and responsive to a timing signal for defining the second predetermined period of time during which the modulation signal is minimized for counting the carrier pulses. The adjustment device is responsive to the measurement device, for varying the voltage applied to the voltage controlled oscillator to maintain the predetermined frequency of the carrier signal and being responsive to the measurement device for varying the voltage applied to the voltage controlled oscillator to maintain the predetermined bandwidth of the modulated carrier signal. There is counting means, responsive to the adjustment device, for counting within a predetermined period of time the number of times the adjustment device has varied the voltage applied to the voltage controlled oscillator. There is an indicating device, responsive to the counting means, for indicating the operational status of the adjustment device and the measurement device.

In a preferred embodiment the means for selectively minimizing may include a field effect transistor for attenuating the modulation signal. The adjustment device may include a voltage controlled device for controlling the voltage level at the input to the voltage controlled oscillator. The adjustment device may further include digital to analog convertor means for operating the voltage controlled device.

The invention also features a self-implementing, self-diagnostic system for an anticipatory collision sensor system for a vehicle including a voltage controlled oscillator for generating a signal to be modulated, antenna means having a predetermined band setting for transmitting signals within the band setting, a modulation generator for generating a modulation signal for modulating the carrier signal, means for selectively minimizing the modulation signal to produce a minimized bandwidth in the carrier signal, an adjustment device including a center frequency adjustment circuit for providing a voltage level to the voltage controlled oscillator. There is first adjustment means for adjusting said voltage level to provide a center frequency which is outside of the band setting of the antenna means for producing a first standing wave ratio. There is a first noise measuring means, responsive to the first standing wave ratio, for measuring contemporaneous variations in the first standing wave ratio. There is second adjustment means for adjusting the voltage level to provide a center frequency within the band setting. There is a second noise measuring means, responsive to the second standing wave ratio, for measuring contemporaneous variations in the second standing wave ratio. There is comparing means, responsive to the first noise measuring means and the second noise measuring means, for comparing the contemporaneous variations to predetermined levels, and an indicating device, responsive to the comparing means, for indicating the operational status of the antenna.

The invention also features a self-implementing, self-diagnostic system for an anticipatory collision sensor system for a vehicle including radiation means for radiating a signal and receiving the reflected signal, a detection device, responsive to the reflected signal, for detecting a noise signal in the reflected signal, noise measuring means, responsive to the noise signal, for measuring contemporaneous variations in the noise signal, comparing means for comparing the contemporaneous variations to predetermined levels and an indicating device, responsive to the comparing means, for indicating the operational status of the radiation means.

In a preferred embodiment the detection device may include a plurality of channels for detecting the noise signal, each channel including amplifier means for amplifying the noise signal. Each channel may further include detector means for detecting the peak amplitude of the noise signal to produce a DC voltage signal for the noise signal. The detection device may further include an analog digital convertor for converting the DC voltage signal to a digital signal.

The invention also features a self-implementing, self-diagnostic system for an anticipatory collision sensor system including a transducer device for transmitting a modulated carrier signal, and receiving the reflected modulated carrier signal from an object, a detection device for detecting a Doppler shift in the reflected modulated carrier signal, a range determining device for determining the instantaneous range of the object, noise measuring means, responsive to the reflected signal, for measuring contemporaneous variations in the noise of the reflected signal, comparing means for comparing the contemporaneous variations to predetermined levels and an indicating device, responsive to the comparing means, for indicating the operational status of the radiation means.

In a preferred embodiment the detection device may include a plurality of channels for detecting the noise, each channel including amplifier means for amplifying the noise. Each channel may further include detector means for detecting the peak amplitude of the noise to produce a DC voltage signal for the noise. The range determining device may include an analog digital convertor for converting the DC voltage signal to a digital signal.

The invention also features a self-implementing, self-diagnostic system for an anticipatory collision sensor system including a transducer device for transmitting a modulated carrier signal and receiving the reflected modulated carrier signal from an object, a detection device for detecting a Doppler shift in the reflected modulated carrier signal, a range determining device including microprocessor means, responsive to the Doppler shift, for determining the instantaneous range of the object. There is a velocity measurement device, responsive to the frequency of the Doppler shift, for determining the relative instantaneous velocity of the object and counting means, responsive to a clock signal, for producing a counter value. The microprocessor means includes reset means, responsive to the clock signal, for resetting the counter means after a predetermined period of time, first reset means, responsive to the counting means, for resetting the microprocessor means when the counter value exceeds a predetermined value and voltage measurement means, responsive to the operating voltage of the microprocessor means, for measuring the power supply voltage input to said microprocessor means. There is second reset means, responsive to the voltage measurement means, for resetting the microprocessor means when the operational voltage falls below a predetermined level; and an indicating device, responsive to the voltage measurement means and the counter means, for indicating the operational status of the microprocessor means.

The invention also features a self-implementing, self-diagnostic system for an anticipatory collision sensor system including a transducer device for transmitting a modulated carrier signal and receiving the reflected modulated carrier signal from an object, a detection device for detecting a plurality of Doppler shifted harmonic components from the reflected modulated carrier signal, a range determining device responsive to the amplitude of at least two of the harmonic components for determining the instantaneous range of the object, a velocity measurement device, responsive to the frequency of at least one of the harmonic components, for determining the relative, instantaneous velocity of the object and an indicating device, responsive to at least one of the modulated carrier signal, the reflected modulated carrier signal, the amplitude, and the frequency, to indicate the condition of the system.

DISCLOSURE OF PREFERRED EMBODIMENT

Other objects, features and advantages will occur to those skilled in the art from the following description of a preferred embodiment and the accompanying drawings, in which:

FIG. 3A is a representation of the first harmonic of the modulation signal of the Doppler signal received from a potential colliding object, the envelope of which represents the Doppler shift;

FIG. 3B is a representation of the second harmonic of the modulation signal of the Doppler signal received from a potential colliding object, the envelope of which represents the Doppler shift;

FIG. 3C is a representation of the demodulated $K^{th}$ harmonic of the Doppler frequency;

FIG. 3D is a representation of a filtered harmonic which provides a DC voltage signal of that harmonic;

FIG. 3E is a representation of a Doppler harmonic output from a comparator circuit which provides a pulse signal of the same frequency as the Doppler harmonic;

FIG. 13 is a detailed block diagram similar to FIG. 5 showing in full lines the components directly tested by the overall system self-test of FIG. 2.

Recent developments in pre-crash sensors have produced an anticipatory collision sensor system which uses a modulated carrier signal in the radar range to detect a potential colliding object. Such an anticipatory collision sensor system may contain several component units to include an RF unit, for producing a carrier signal and transmitting the modulated carrier signal and receiving the reflected modulated carrier signal from an object; a detection unit which may include a detection device for detecting variations in the received, reflected signal and a range determining device for monitoring the variations detected; a collision decision device for determining that a collision with an object is imminent based on the variations detected; and a frequency and bandwidth control unit which may include an adjustment device and velocity determining device for monitoring and maintaining accurate center frequency and bandwidth of the carrier signal.

Figure 1:
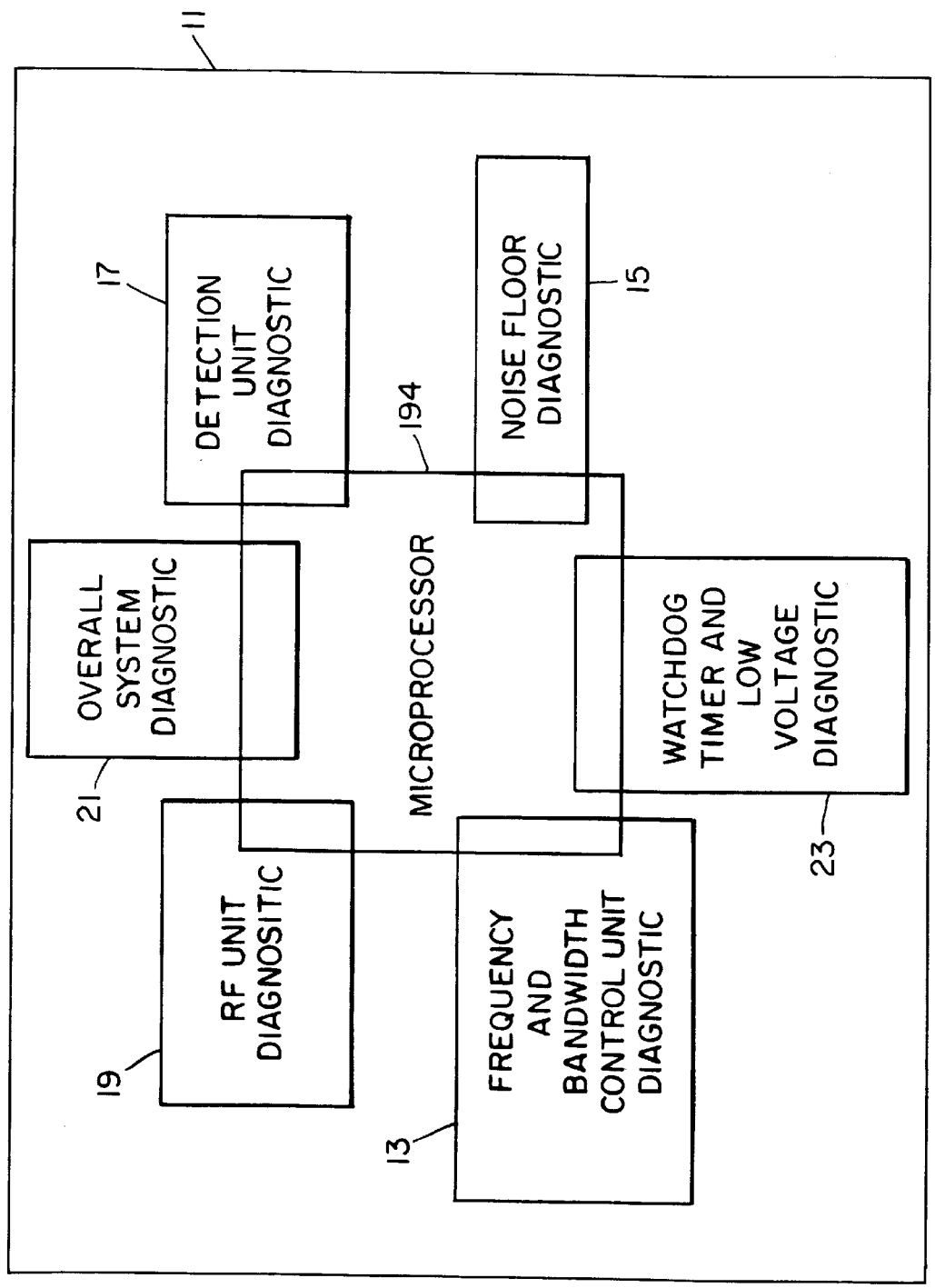
FIG. 1 is a simplified block diagram of the individual unit self-tests performed by the system diagnostic of the present invention.

In order to guarantee proper operation of such an anticipatory collision sensor system it is necessary to test the system to determine that the components of the system are working reliably. A system diagnostic 11, FIG. 1, includes several sub-diagnostics which test individual components of the anticipatory collision sensor system. A frequency and bandwidth control unit diagnostic 13 in cooperation with a microprocessor 194 tests the frequency and bandwidth adjustment circuits at start-up to ensure that the center frequency and bandwidth of the carrier signal will be maintained. The center frequency of the carrier signal is set to the proper center frequency. Once the center frequency is set the bandwidth is set to a minimum and slowly increased until the desired bandwidth is obtained. To ensure consistent range determining capability, the frequency and bandwidth control unit test is performed periodically throughout normal operation of the automobile.

After the frequency and bandwidth are set, prior to movement of the automobile, a noise floor diagnostic 15 measures the inherent noise in the system to establish a minimum level of noise, or noise floor, which is used by microprocessor 194 as a reference to distinguish activity around the automobile in order to determine whether the system is operating properly.

Once the noise floor has been established, a detection unit diagnostic 17 introduces a perturbation into the system to induce a synthetic Doppler signal that is used to test the detection unit. Introducing the perturbation at a predetermined point produces a Doppler frequency. The actual frequency is compared to the value that should occur when the perturbation is introduced at a given point. The detection unit is tested without any external stimuli through modification of internally generated signals. Thus, the anticipatory collision sensor system is capable of testing itself without additional inputs or hardware.

In order for the sensor system to operate properly, it must be able to generate and transmit a signal. An RF unit diagnostic 19 adjusts the frequency of the oscillator to an out of band setting of the antenna and measures the signal reflected back into the system. Microprocessor 194 measures the noise floor ratio of the different reflected signals and indicates whether or not the antenna is working properly. However, although the antenna may be radiating, the signal may not be illuminating objects, thus an overall system diagnostic 21 tests the radiation pattern by measuring increases in noise caused by bumpy roads and distant objects and compares the increase to the noise floor measured at start-up. The fact that the noise is changing is itself an indication that the radiation pattern of the antenna is normal. This test is performed periodically throughout normal operation to ensure constant operation of the anticipatory collision sensor system.

To ensure that the microprocessor is functioning properly a watchdog timer and low voltage diagnostic 23 is used to monitor the microprocessor and the power supply voltage. A watchdog timer waits for scheduled resets. If an interrupt is not received, the microprocessor is reset and the start-up diagnostic restarts. A low voltage monitor monitors the voltage of the power supply to ensure proper voltage is supplied to the system.

Figure 2:
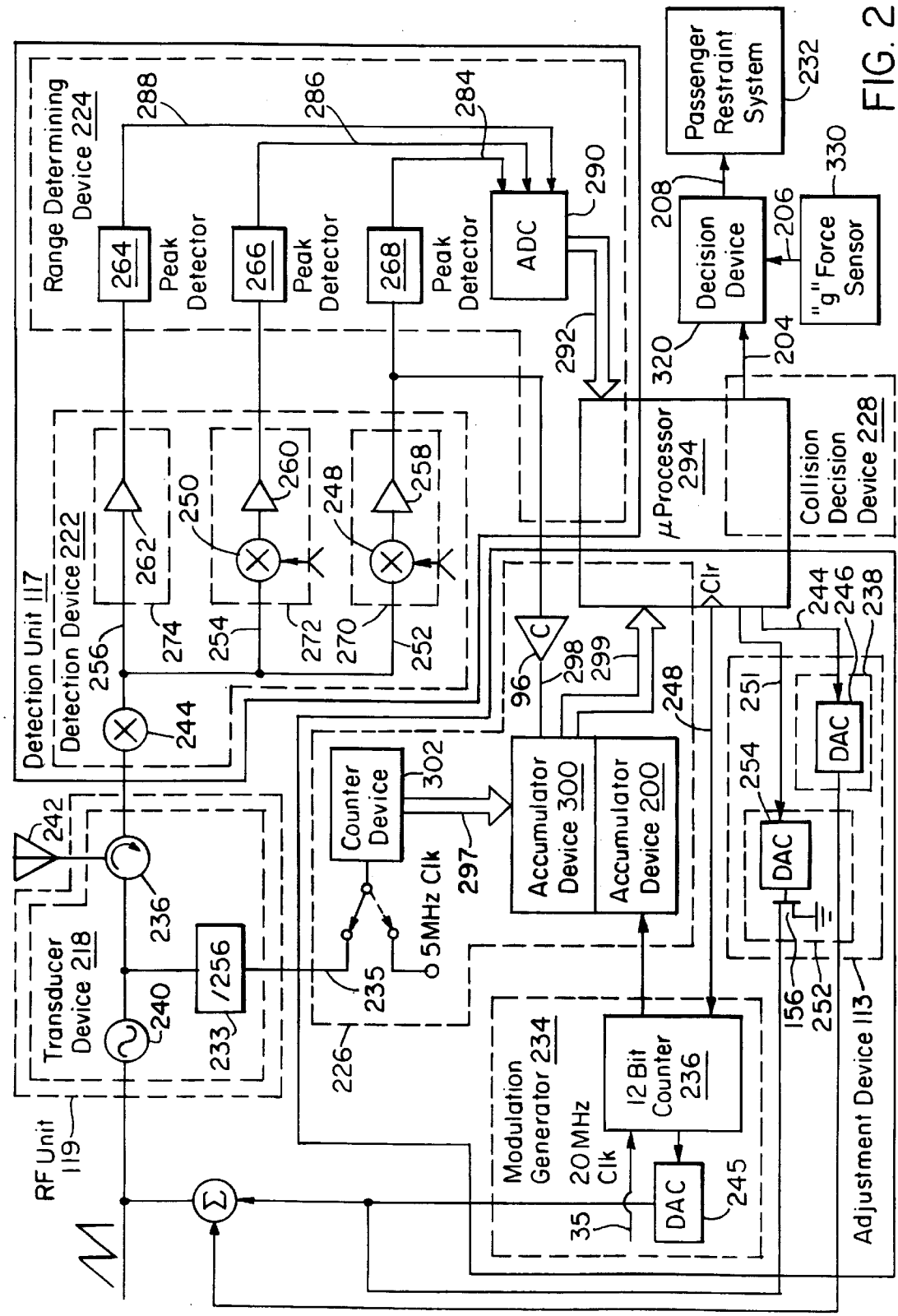
FIG. 2 is a detailed schematic of an anticipatory collision sensor system.

A better understanding of the system diagnostic can be obtained by first understanding how such an anticipatory collision sensor system operates. An RF unit 119, FIG. 2, includes a transducer device 218 which includes a voltage controlled oscillator 240 that generates a carrier signal having a center frequency of 5.8 GHz. In order to remain within FCC guidelines for unlicensed sensor operation, the bandwidth of the signal must be such that the carrier signal stays within the range of 5.725 GHz to 5.875 GHz. The frequency range, or bandwidth, of voltage controlled oscillator 240 is dictated by the changes in amplitude of the modulation signal. The modulation frequency is typically chosen to be roughly ten times larger than the Doppler frequency. The modulated carrier signal is delivered to a circulator 237 which transmits the modulated carrier signal to an antenna 242.

Antenna 242 radiates the modulated carrier signal, which is reflected off objects within a predetermined range, typically from two to ten feet away to just beyond the bumper. The reflected signal is then received by antenna 242. RF unit 119 with or without mixing device 244 may be provided in a single MMIC radar chip manufactured by Hittite Corporation of Massachusetts and includes a single transmit/receive antenna.

A Detection unit 117 includes a detection device 222 which beats the received signal with the modulated carrier signal using a mixer 244. The local oscillator for mixer 244 is provided by the leakage of the modulated carrier signal from circulator 237. Mixer 244 produces a beat frequency, or composite Doppler signal, which is the frequency difference between the modulated carrier signal and the received reflected signal. The composite Doppler signal is comprised of a plurality of signals to include the harmonic components of the reflected modulation frequency. The frequency of the harmonics of the modulation frequency present in the composite Doppler signal differ from the modulation frequency by the Doppler frequency.

The harmonic components of interest are the first harmonic component, second harmonic component and the DC harmonic component of the modulation signal. Detection device 222 contains a plurality of signal paths 252, 254, and 256 which deliver the Doppler shifted harmonic components to a plurality of channels 270, 272, and 274 respectively, for extracting the Doppler from the harmonic components. Channel 270 contains a mixer 248 which mixes the Doppler shifted first harmonic component, represented by waveform 276, FIG. 3A, with the modulation signal, 156.25 KHz: Envelope 277 represents the Doppler frequency while the first harmonic is represented by waveform 279. This demodulation extracts the Doppler of the first harmonic component of the modulation signal, or first Doppler, the envelope of the Doppler shifted harmonic component. Channel 270 also includes a Doppler amplifier 258 which includes a pulse shaping circuit that amplifies and rectifies the first Doppler. This signal is represented by waveform 281, FIG. 3C. Thus, this signal has the frequency of the Doppler frequency and the amplitude represents the variations of the first harmonic component of the modulation signal of the reflected signal. The Doppler amplifier 258 supplies the amplified, rectified, first Doppler to a range determining device 224. Range determining device 224 includes a peak detector 268 which includes an RC network which produces a DC voltage as illustrated by waveform 280, FIG. 3D.

In a similar manner as channel 270, channel 272 contains a mixer 250 which mixes the Doppler shifted second harmonic component, represented by waveform 278, FIG. 3B, with a signal which is twice the frequency of the modulation signal, 312.5 KHz. This demodulation produces the Doppler of the second harmonic component, or second Doppler, of the modulation signal. Channel 272 contains a Doppler amplifier 260 which includes a pulse shaping circuit which amplifies and rectifies the second Doppler. This signal is similar to that illustrated by waveform 281, FIG. 3C. The amplified, rectified second Doppler is then delivered to range determining device 224. Range determining device 224 includes a peak detector 266, similar to peak detector 268, which produces a DC voltage output similar to that illustrated by waveform 280 of FIG. 3D.

Channel 274 includes a Doppler amplifier 262 which amplifies and rectifies the Doppler signal to produce the Doppler of the DC component of the reflected modulation signal, or Doppler. The DC Doppler is delivered to peak detector 264, similar to peak detectors 266 and 268, to produce a DC voltage similar to waveform 280 of FIG. 3D.

The DC voltage signals of the first Doppler, second Doppler, and DC Doppler are delivered to an analog to digital converter 290 via signal paths 284, 286 and 288, respectively. Analog to digital converter 290 converts the DC voltages to digital signals which it then supplies to a microprocessor 294 via signal bus 292. Microprocessor 294, through the implementation of software, monitors the Doppler amplitude of each harmonic component and its relationship with the Doppler amplitudes of the other harmonic components to determine the instantaneous range of an object. The instantaneous range is determined using the intersection of the first and second Doppler amplitudes, known as a range bin crossing. The amplitude, phase, and relative Doppler sideband character of each of the harmonic components are a function of object range, relative velocity magnitude and sense, and peak to peak frequency deviation. Once a predetermined relationship between the harmonics is detected, microprocessor 294 enables a velocity measurement device 226 to determine the instantaneous velocity of the object.

Velocity measurement device 226 includes a comparator device 296 which is connected to the output of channel 270 of detection device 222, since the first harmonic component has the greatest amplitude in the region in which velocity is measured. Comparator 296 receives the amplified, rectified first Doppler and compares the level of that output to a predetermined value. If the level of the input exceeds a predetermined value, comparator 296 outputs a high signal.

If the input does not exceed the predetermined value, comparator 296 outputs a low value. The resulting output, a series of Doppler pulses, is illustrated by waveform 282, FIG. 3E, is delivered over signal path 298 to velocity measurement device 226. Velocity measurement device 226 includes a velocity measurement circuit having an accumulator device 300, such as a capture register, which is driven by the Doppler pulse supplied over signal path 298. During velocity measurement, accumulator device 300 is enabled and accumulator device 200 is disabled. Counter device 202 is interconnected with accumulator device 300 via signal bus 297. Counter device 202, driven by an internal 5 MHz clock, continuously counts the cycles of the 5 MHz clock. With every rising edge of the Doppler pulse from comparator 296, accumulator device 300 sends an interrupt to microprocessor 294, a portion of which is shared with range determining device 224, and simultaneously reads counter device 202 and stores the number of cycles counted. With every interrupt received by microprocessor 294 from accumulator device 300 microprocessor 294 reads the cycle count stored in accumulator device 300, resets counter device 202 and increments a Doppler count by 1. The Doppler count represents the number of Doppler pulses received. Thus, velocity measurement device 226 counts the number of 5 MHz clock pulses that occur for each Doppler pulse. Since the Doppler pulse is derived from a rectified Doppler component, each pulse represents one half Doppler cycle. The process is repeated with each rising edge of the Doppler pulse, each 5 MHz cycle count being added to the previous cycle count stored in microprocessor 94, until the Doppler count is equal to four. Once the Doppler count equals four, the microprocessor 294 discontinues reading accumulator device 300 and divides by four the total count stored to provide an average 5 MHz cycle count. Microprocessor 294 then refers to a look up table to determine what velocity is associated with that average count. Accumulator device 300 continues to send an interrupt to microprocessor 294 with every rising edge of the Doppler pulse. Although the microprocessor no longer reads accumulator device 300, with every interrupt it receives from accumulator device 300, microprocessor 294 continues to increment the Doppler count. The Doppler count represents the number of Doppler pulses received, each pulse being equivalent to 0.5 inches of relative movement by the object; each Doppler cycle is one half the wavelength of the 5.8 GHz carrier signal. Thus, once the range bin crossing is detected, providing an instantaneous range of the object, the object's range thereafter can be tracked by counting the Doppler pulses reflected from the object.

While the velocity is being determined, microprocessor 294, a portion of which is included in a collision decision device 228, continues to monitor the amplitude of the Doppler. When collision decision device 228 has determined that a collision is imminent, a fire signal along with the velocity information is sent to decision device 220 via signal path 204 which signals the passenger restraint system 232 to fire the airbag as soon as sufficient impact occurs, but earlier than "g" force sensor 230 would signal the airbag to fire.

To maintain accurate range determining capability, the center frequency and bandwidth of the carrier signal produced by voltage controlled oscillator must be compensated, regardless of external influences such as temperature. It is important to measure the modulated carrier center frequency with a signal co-generated with the modulation signal. Frequency and bandwidth control unit 113 includes a modulation generator 234 which includes a 12-bit divide-by-2 counter 236 for generating a plurality of digital signals used to produce the modulation signal which modulates the carrier signal produced by voltage controlled oscillator 240. A divide-by-256 prescaler 233 is provided at the output of voltage controlled oscillator 240 to divide the radar frequency to a lower frequency more compatible for digital processing. Divide-by-256 prescaler 233 delivers the modulated carrier signal via line 235 to drive counter device 202 interconnected with an accumulator device 200 by a signal bus 242. During frequency and bandwidth adjustment, accumulator device 200 is enabled and accumulator device 300 is disabled. Counter device 202 continuously counts the cycles of the modulated carrier signal. With every cycle of a 19.5 KHz signal also produced by 12-bit counter 236 and supplied via signal path 241 accumulator device 200 reads the count from counter device 202 and sends an interrupt to microprocessor 294, a portion of which is included in velocity measurement device 226, via signal path 244. The process is repeated with each cycle of the 19.5 KHz. After microprocessor 294 receives eight interrupts from accumulator device 200, microprocessor 294 reads the modulated carrier signal cycle count stored in accumulator device 200, resets counter device 202 and clears accumulator device 200. Microprocessor 294 then refers to a look-up table to determine what frequency is associated with that total count. For example, for a center frequency of 5.8 GHz , the cycle count would equal 9294. If the count was 9296, the frequency would be 5.801 GHz. Accumulating the counter value for eight cycles of the 19.5 KHz signal provides a resolution of at least 1 MHz: for every 1 MHz variance of the carrier signal there is a corresponding change in the cycle count.

If the counter value correlates to a center frequency other than 5.8 GHz , microprocessor 294 sends a correction word to frequency control circuit 246 within adjustment device 238. Frequency control circuit 246, such as a digital to analog converter, varies the voltage at the input of voltage controlled oscillator 240 to adjust the center frequency to the desired value, 5.8 GHz .

Once the center frequency has been adjusted to the proper value, the bandwidth of the modulated carrier signal can be determined. Modulation generator 234 includes a stair case generator 245 which produces a sawtooth analog signal at a frequency of 156.25 KHz. This sawtooth signal is superimposed on a constant voltage level, also produced by 12-bit counter 236. This constant voltage level may be positive, zero, or negative. After correcting the center frequency, microprocessor 294 sends a CLEAR signal to 12-bit counter 236 via signal path 248 which momentarily clears the counter and reduces the modulation signal to zero. At this point, the only output from 12-bit counter 236 is the constant voltage level. With the modulation signal at zero, the frequency of the carrier signal produced by voltage controlled oscillator 240 is determined in the same manner as the center frequency discussed above. However, once the frequency has been determined it is compared to a predetermined value which represents the lower end of the desired bandwidth, 5.75 GHz. If the frequency is determined to be different than the desired frequency of 5.75 GHz, microprocessor 294 sends a control word via signal path 251 to voltage control device 252. A digital to analog convertor 254 adjusts the bias to junction field effect transistor (JFET) 256 which attenuates the modulation signal produced by modulation generator 234.

Attenuating the modulation signal affects the input voltage to voltage controlled oscillator 240 necessarily affecting the center frequency. Therefore, it is necessary to again determine and adjust the center frequency in the manner discussed above. The bandwidth and center frequency are alternately adjusted until the proper values of center frequency and bandwidth are obtained.

The viability of the above anticipatory collision sensor system is based in part on the characteristics of a modulated carrier signal. The range capability of the system is derived from the characteristics of the modulation signal produced by a modulation generator for a given bandwidth of the carrier signal produced by the voltage controlled oscillator. Consequently, for such an anticipatory collision sensor system to be reliable it should be internally tested to ensure the components are functioning correctly.

Every time the vehicle is started, the system diagnostic test is run. The effectiveness of the system depends on proper frequency and bandwidth of the modulated carrier signal. At start-up the frequency and bandwidth control unit is tested to ensure that the modulated carrier signal produced has the proper center frequency and bandwidth. The center frequency of the voltage controlled oscillator is adjusted to the desired center frequency. Once this is accomplished, the bandwidth is set to the minimum bandwidth and iteratively adjusted until the desired bandwidth is obtained. Each adjustment of the bandwidth affects the center frequency, thus each bandwidth adjustment is accompanied by a corresponding center frequency adjustment. The adjustments are repeated until both the center frequency and the bandwidth are properly set.

Figure 4A:
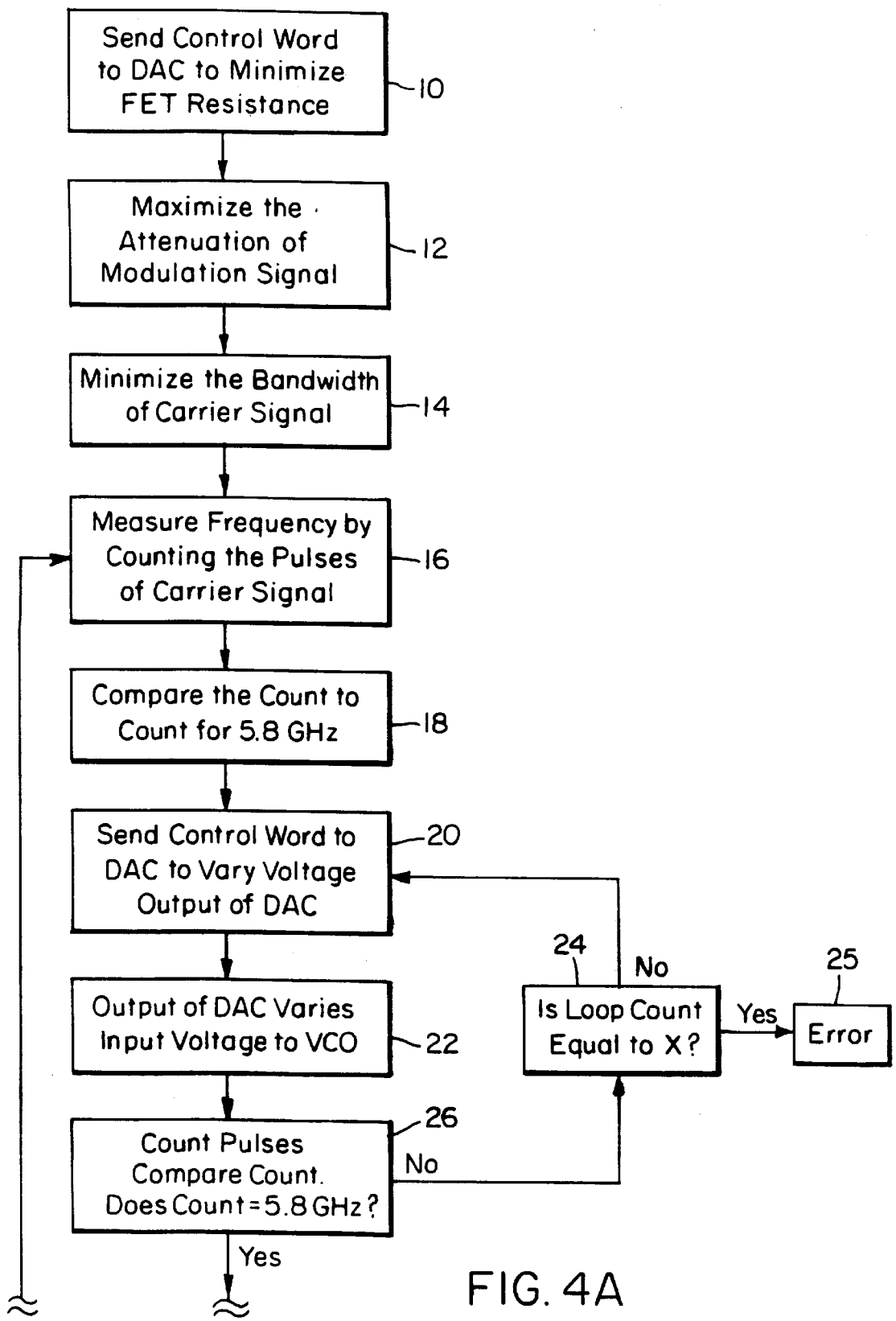
FIG. 4A is a flow chart of the frequency and bandwidth control unit self-test performed at start-up by the self-implementing, self-diagnostic system according to this invention.
Figure 4B:
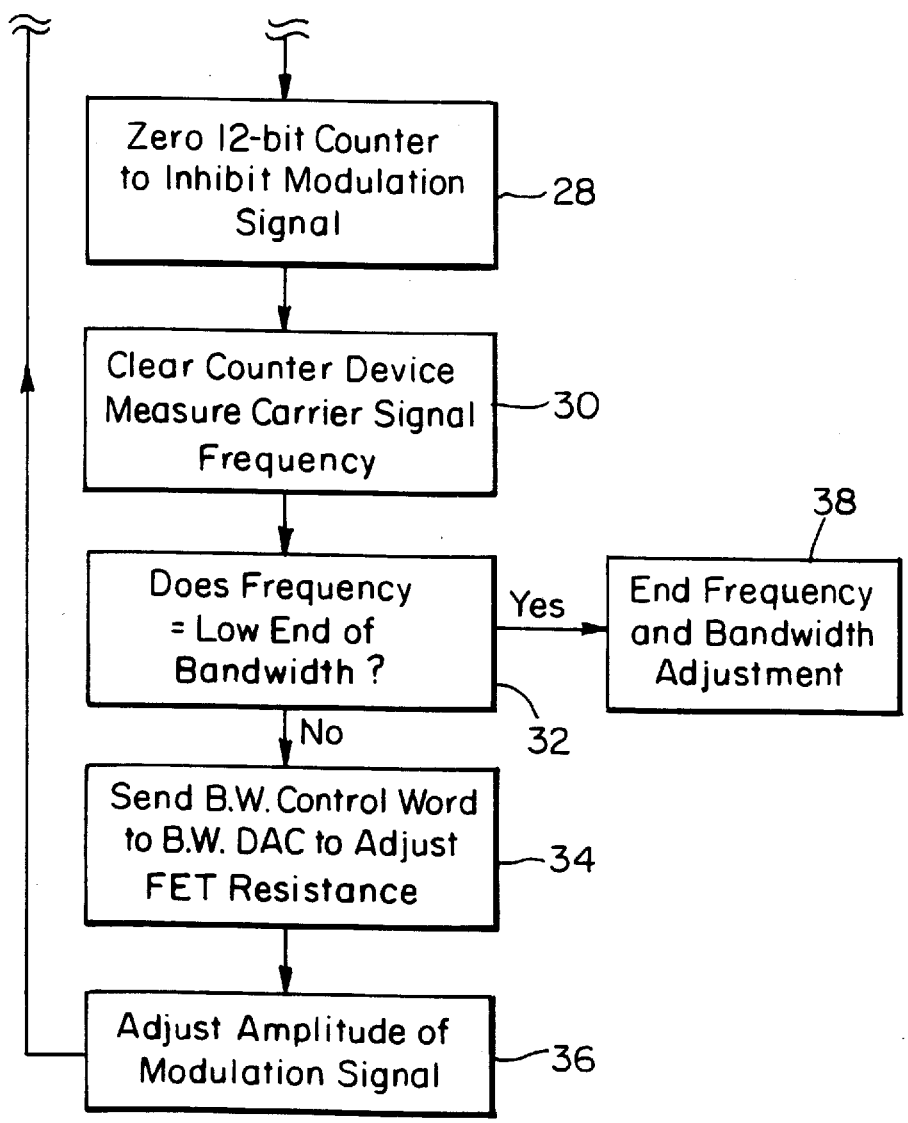
FIG. 4B is a continuation of the flow chart of FIG. 4A.

A logic "0" is sent to the digital to analog converter of the bandwidth adjustment circuit, step 10, FIGS. 4A and 4B. Zeroing the digital to analog converter sets the resistance of the junction field effect transistor (JFET) to a minimum value whereby the attenuation of the modulation signal is maximized, step 12. Maximizing this attenuation minimizes the amplitude of the modulation signal. The modulation signal is produced by a modulation generator which includes a 12-bit counter. The modulation signal is input to the voltage controlled oscillator. The variations in amplitude of the modulation signal directly affect the frequency range output by the voltage controlled oscillator. Thus, minimizing the amplitude of the modulation signal minimizes the initial bandwidth of the carrier signal, step 14. The frequency of the carrier signal is then measured, step 16, and compared to the desired center frequency of 5.8 GHz. The frequency is determined by a velocity measurement device. By counting the number of cycles of the carrier signal during a predetermined number of clock pulses the frequency is measured. The count is compared to a predetermined count representing 5.8 GHz, step 18, and if the count is incorrect, a control word is sent by the microprocessor to a frequency control circuit which includes a digital to analog converter, step 20. The digital to analog converter output, which is the input to the voltage controlled oscillator, is adjusted by the control word thereby adjusting the voltage applied to the voltage controlled oscillator, step 22, which in turn adjusts the frequency. The frequency is again measured and compared to 5.8 GHz, step 26. If the frequency is not correct, the process is repeated until the proper center frequency is achieved. If after a predetermined number of iterations, step 24, the center frequency is not properly adjusted, and error signal is sent by the micro-processor to an indicator, such as a light on the instrument panel to alert the driver that there is an error in the operation of the system, step 25. When the center frequency is properly adjusted the bandwidth is adjusted. The 12-bit counter used to generate the modulation signal is zeroed, step 28. This inhibits the modulation signal for a very short duration. The counter of the velocity measurement device is also zeroed, step 30, and the frequency of the carrier signal is measured. The frequency at this point is compared to the low end of the bandwidth, here 5.75 GHz, step 32. If the frequency is correct then the bandwidth is correct and the test is completed as to frequency and bandwidth. If, however, the bandwidth is not correct the microprocessor sends a control word, step 34, to the digital to analog converter of the bandwidth control circuit which adjusts the resistance of the JFET and attenuates the amplitude of the modulation signal a predetermined amount, step 36, thereby adjusting the voltage controlled oscillator to the proper bandwidth. Returning to step 16, the frequency of the carrier signal is again measured: adjusting the bandwidth necessarily changes the input voltage to the voltage controlled oscillator and therefore effects the frequency. Steps 18–38 are repeated until the proper center frequency and bandwidth are achieved. At initial start-up, this may take several iterations. However, even several iterations can be completed in less than 10 milliseconds.

Figure 5:
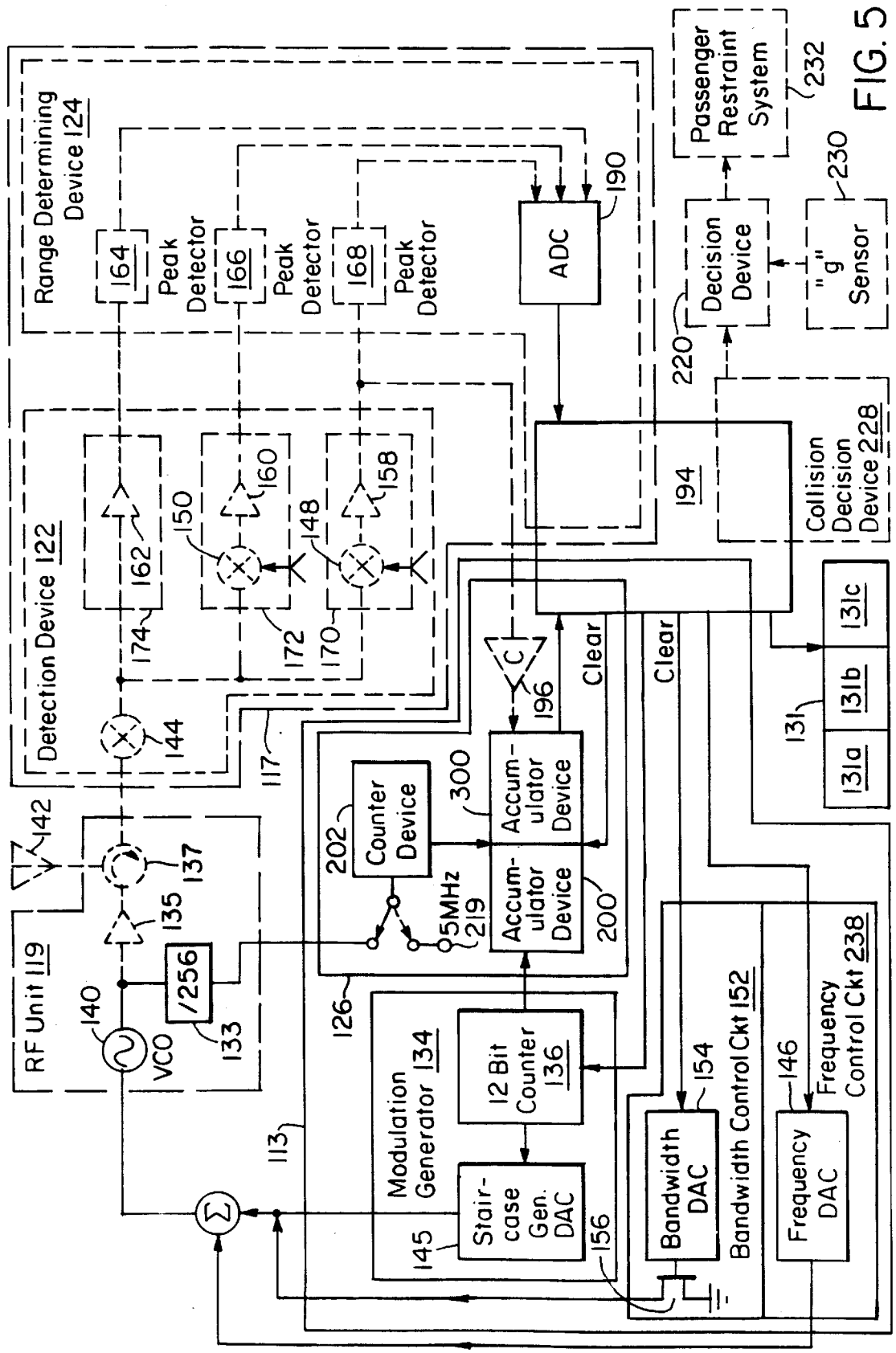
FIG. 5 is detailed block diagram of an anticipatory collision sensor system showing in full lines the components directly tested at start-up by the frequency and bandwidth control unit self-test of FIGS. 4A and 4B.

At start-up microprocessor 194, FIG. 5, sends a control word to digital to analog converter 154 which adjusts its output voltage changing the shunt resistance of JFET 156. The components of the anticipatory collision sensor system directly tested by the frequency and bandwidth control unit 113 are shown in full lines while the untested portion is shown in phantom. Changing the output voltage causes JFET 156 to attenuate the modulation signal at the output of digital to analog converter 145 which operates as a stair case generator. Counter device 202 counts the cycles of the carrier signal for a period of time defined by clock input 219. Accumulator device 200 is enabled during the frequency and bandwidth self-test and accumulator device 300 is disabled. Accumulator device 200 reads the count in counter device 202 every cycle of the clock input 219. Microprocessor 194, after a predetermined number of cycles of clock input 219, determines an average count. Typically, the number of cycles averaged is four. Microprocessor 194 compares the count to a lookup table value which corresponds to the desired frequency. If the comparison fails, microprocessor 194 sends a control word to digital to analog converter 146 of the frequency adjustment circuit which adjusts the voltage at the input of voltage controlled oscillator 140. Proper adjustment of the center frequency indicates proper operation of 12-bit counter 136, the digital to analog converter of the frequency control circuit 146, voltage controlled oscillator 140 and velocity measurement device 126. Once the frequency is adjusted, microprocessor 194 clears counter device 202, as well as 12-bit counter 136 to inhibit the modulation signal. The frequency is measured; however, as discussed above this time the low end of the bandwidth is the desired frequency, not the center frequency. If the frequency does not correspond to the desired frequency, microprocessor 194 sends a bandwidth control word to digital to analog converter 154 which adjusts JFET 156 resistance, as discussed above, in order to adjust the amplitude of the modulation signal. The center frequency is measured again and the entire process is repeated until the proper frequency and bandwidth are obtained. Proper adjustment of the bandwidth indicates that digital to analog converter 154 of bandwidth control circuit 152, JFET 156, and 12-bit counter 136 of modulation generator 134 are operating properly. Additionally, proper adjustment of the frequency and bandwidth inherently indicate that microprocessor 194 is functioning normally also. If during any point of the frequency and bandwidth adjustment too many iterations occur, an error signal is sent by microprocessor 194 to an indicator device 131 which may be a single light on the instrument panel or an indicator 131a corresponding to frequency and bandwidth control circuit 113 to alert the driver that the system, or frequency and bandwidth control circuit 113 in particular, is not operating properly. A malfunction in voltage controlled oscillator 140, modulation generator 134, bandwidth control circuit 152, or frequency control circuit 146 will cause the indicator light to turn on. Thus, the frequency and bandwidth control unit is self-tested without any external stimuli or additional hardware. the absence of an error infers that the unit is working properly.

The frequency and bandwidth control diagnostic of the system diagnostic is performed each time the vehicle is started, to confirm accurate operation of the system. However, to ensure continual effectiveness of the sensor system, the center frequency and bandwidth are also periodically measured and adjusted throughout normal operation. Because the frequency and bandwidth adjustment can be accomplished in less than one millisecond, diagnostic testing of the frequency and bandwidth control unit 113 during normal operation of the automobile will not interfere with the operation of the anticipatory collision sensor system. Further, if an object is detected during the adjustment process, the detection of the object overrides and interrupts the frequency and bandwidth adjustment allowing the object to be monitored to determine whether a collision with the object is imminent.

In order for the anticipatory collision sensor system to detect when an object is approaching the automobile, the system must be able to detect and differentiate variations in the received reflected signal. However, before the system can recognize conditions which indicate that a collision with an object is imminent, the system must recognize a signal which represents no or minimal activity. Only then can the anticipatory collision sensor system detect the variations that indicate that a collision is imminent. The least amount of activity occurs when the automobile is stationary, particularly at start-up when the automobile's exposure to reflections is at a minimum as compared to stopping in traffic. Measuring both the noise inherent in the system and the noise due to ambient reflections received by the antenna establishes a minimum level, or noise floor, of the system to be used as a reference to compare future incoming signals with, for example, motion around the automobile such as passing vehicles and pedestrians which typically represent non-colliding objects and can be used to distinguish signals representing potential colliding objects.

Figure 6:
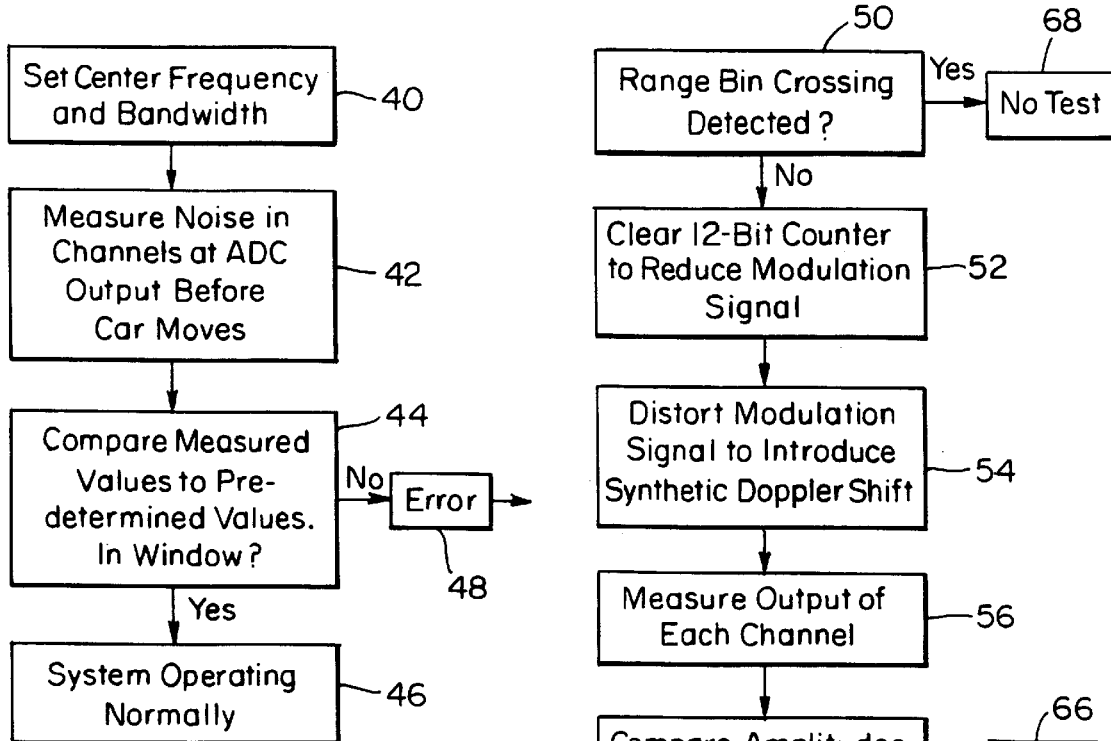
FIG. 6 is a flow chart of the noise floor self-test at start-up used to establish a minimum noise level of the system.

Once the center frequency and bandwidth have been set, step 40, FIG. 6, the noise in the system is measured and saved, step 42, to be used for future reference as a floor for prospective noise measurements throughout normal operation of the automobile. The measured values are compared to predetermined values, step 44, to determine whether the noise levels are within a window defined by the predetermined values. These predetermined values are based on previously measured data with the precrash sensor system mounted in its final configuration in the automobile. These predetermined values represent those which are normally expected with the presence of objects at fixed distances such as a painted plastic bumper or nearby license plate. If the measured noise is not within the predetermined window, an error message is sent by the microprocessor, step 48, to the instrument panel to alert the driver of the non-operational status of the anticipatory collision sensor system. If the measured noise levels are within the predetermined window, the noise levels are saved and used as a reference to infer that the vehicle is not in motion. When the vehicle is in motion, the antenna receives much more activity than when the automobile is idle, thus the noise levels will be higher indicating that the automobile is moving.

Figure 7:
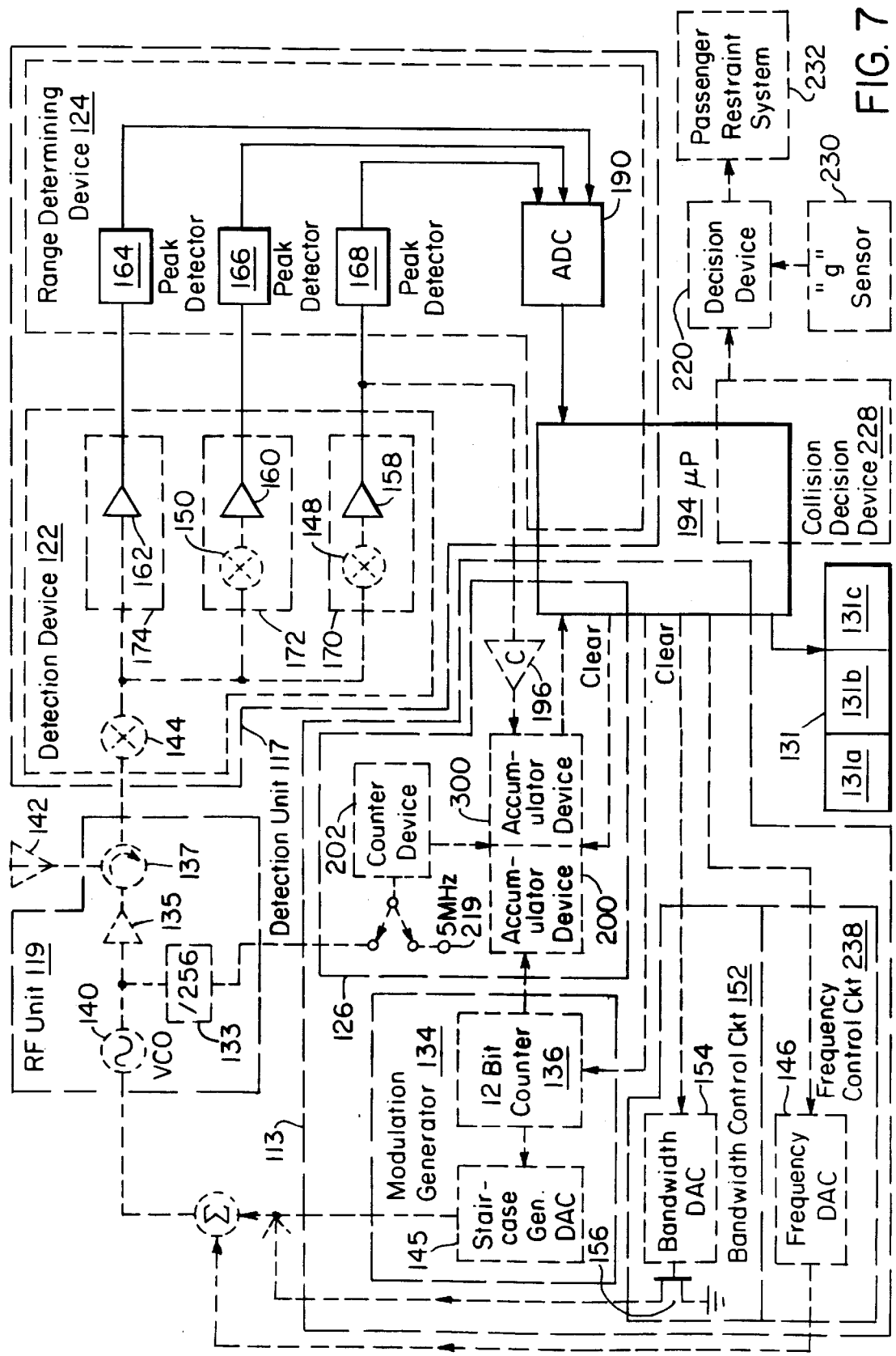
FIG. 7 is a detailed block diagram similar to FIG. 5 showing in full lines the components directly tested at start-up by the noise floor self-test of FIG. 6.

The inherent noise in the anticipatory collision sensor system is measured by detection unit 117, FIG. 7, which includes a detection device 122 having a plurality of channels including a plurality of amplifiers 158, 160 and 162, each amplifier being associated with an individual channel. The portion of the anticipatory collision sensor system directly tested are shown in full lines while the rest of the system is shown in phantom. The noise output by amplifiers 158, 160 and 162 is amplified and enters peak detectors 168, 166 and 164, respectively, which produce a DC voltage level of the amplified noise from each amplifier. The DC voltage level is then converted by analog to digital convertor 190 so that microprocessor 194 can measure the amplitude of the noise levels in each channel and compare that amplitude with predetermined levels discussed above. Thus, the measurement of the noise in each channel establishes the noise floor of the anticipatory collision sensor system and simultaneously confirms the operation of the amplifier and peak detector in each channel as well as the operational status of analog to digital converter 190. If the noise measurements do not fall within the window defined by the predetermined values, microprocessor 194 sends an error signal to an indicator device 131 which may be a single light on the instrument panel or an indicator 131*b* corresponding to detection unit 117 to alert the driver that the system, or detection unit 117 in particular, is not operating properly. A malfunction in amplifiers 158–162, peak detectors 164–168, or analog to digital converter 190 will cause the indicator light to turn on. The absence of an error message is an indirect indication that microprocessor 194 is functioning properly. As above, the self-test to establish the noise floor and the operability of the components associated with the noise measurement is conducted without the need of additional testing hardware using only signals generated by the system.

After establishing the noise floor, the detection unit can be tested. The detection unit includes a detection device which detects the Doppler shift in the reflected signal and separates the Doppler from the harmonic components of the modulation signal of the reflected signal as discussed in FIG. 2. However, at start-up, there is little or no activity from which a Doppler shift may be detected. Introducing a "synthetic Doppler" into the detection unit at a predetermined time produces Doppler shift of a known frequency. Thus, the actual synthetic Doppler shift detected can be compared to the known frequency to determine that the system detection unit is operating properly. The detection unit self-test is also performed periodically throughout normal operation of the automobile to ensure that the detection unit is still functioning accurately.

Figure 8:
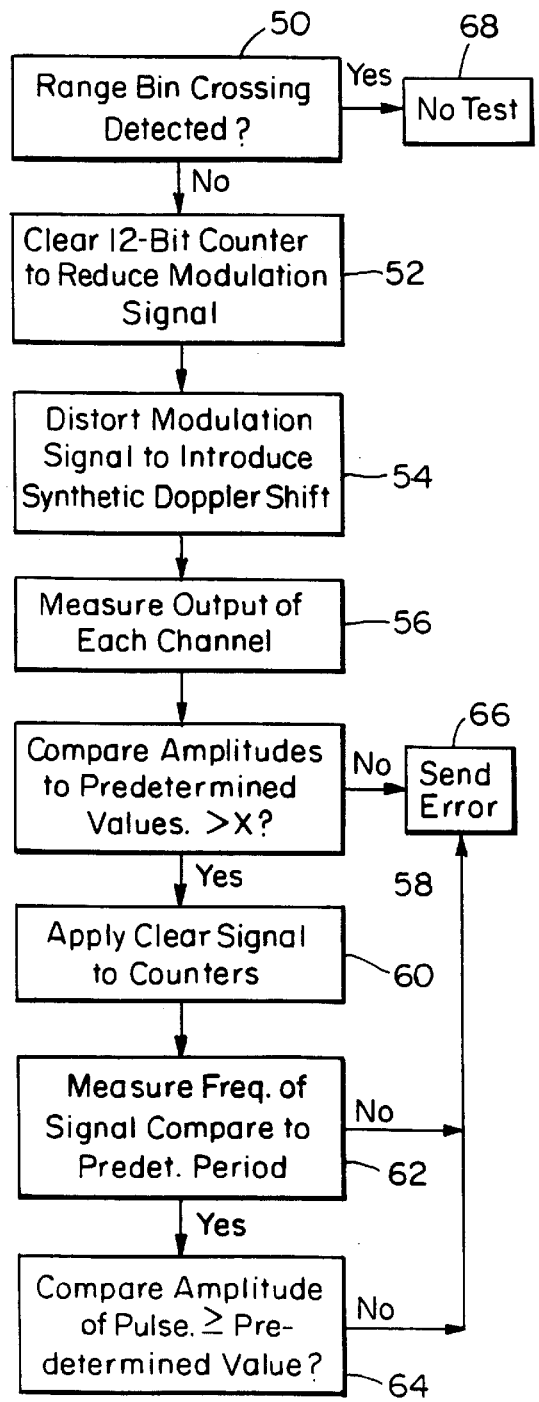
FIG. 8 is a flow chart of the detection unit self-test at start-up used to test the operation of the detection device and range determining device.

First, the system insures that a range bin crossing has not been detected, step 50, FIG. 8. Even at start up it is possible that an object could collide with the automobile and thus detection of a range bin crossing will always override and interrupt the detection unit self-test. If a range bin crossing has been detected, there can be no test, step 68, since the anticipatory collision sensor system must track the object to determine whether a collision is imminent. If no range bin crossing has been detected, the microprocessor sends a CLEAR signal to the 12-bit counter which momentarily distorts the modulation signal by reducing its amplitude momentarily, step 52. The distortion, or perturbation, is introduced into the system, step 54. This perturbation introduces a synthetic Doppler shift. The detection device includes a plurality of channels which detect the Doppler shift. Each channel is dedicated to extracting a predetermined component of the perturbed modulation signal.

Typically, the components of interest are the first harmonic component, second harmonic component and the direct component of the modulation signal. The output of each channel is measured, step 56, to determine the amplitude at each output. The amplitudes are then compared to predetermined values derived from a combination of both the magnitude of the phase perturbation applied to the modulation waveform and the internal time delay which exists in the specific hardware implementation between the local oscillator signals in detection device 122 and the time in which RF unit 119 settles to the perturbed frequency value, step 58. If the amplitudes at the channel outputs do not exceed the predetermined the values then an error message, step 66, is sent by the microprocessor to the an indicator device to alert the driver to a malfunction in the system. If, however, the amplitudes do exceed the predetermined value a CLEAR signal is sent to the counters, step 60, the frequency of the perturbed signal is measured, step 62, and the period of the signal is compared to a predetermined period. If the two periods are not equal, then an error signal is sent, step 66, by the microprocessor to alert the driver that there is a malfunction. If the measured period is equal to the predetermined period, the amplitude of the pulse is compared to a predetermined value, step 64. If the comparison fails, an error message is sent by the microprocessor to alert the driver that there is a malfunction. No error message indicates normal operation of the detection device and range determining device. The detection device includes a plurality of mixers and amplifiers, discussed below, and the range determining device includes a plurality of peak detectors and an analog to digital convertor which converts the amplitudes into digital signals to be read by the microprocessor. The self-test also tests the velocity determining device which includes a counter device, a comparator, and an accumulator device.

Figure 9:
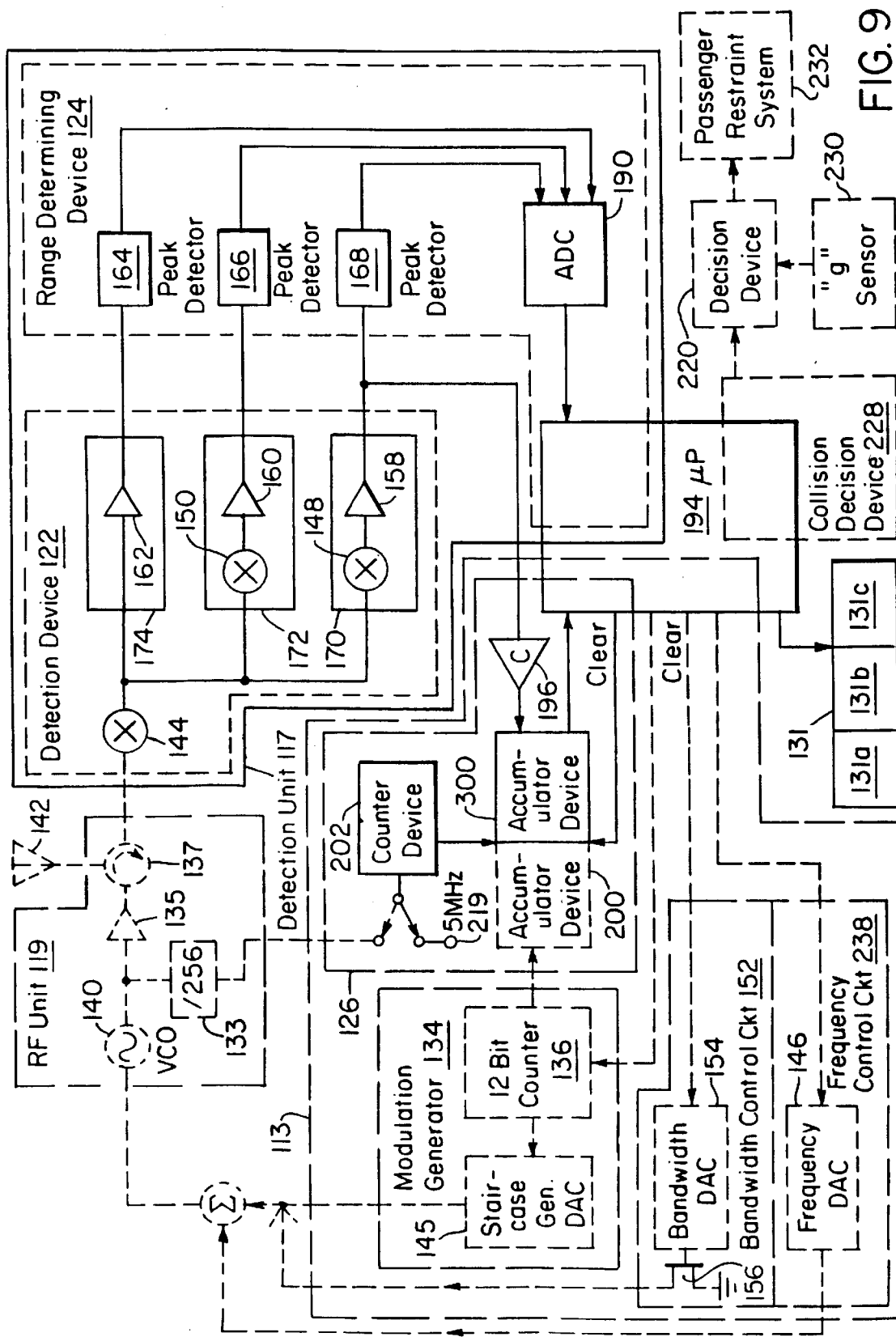
FIG. 9 is detailed block diagram similar to FIG. 5 showing in full lines the components directly tested at start-up by the detection unit self-test of FIG. 8.

A CLEAR signal is applied simultaneously to a 12-bit counter 136, FIG. 9, and to counter device 202, both shown in phantom. This CLEAR resets the counters and starts the counters from zero. Resetting 12-bit counter 136 instantaneously reduces the amplitude of the modulation signal as discussed above to cause a phase perturbation of very short duration. The components directly tested are shown in full lines. Detection unit 117 includes detection device 122 and range determining device 124. Detection device 122 includes a mixer 144 which mixes the perturbed modulated carrier signal with an unperturbed modulated carrier signal to produce a signal which includes a plurality of harmonic components of the modulation signal, the envelope of which represents the synthetic Doppler shift introduced into the system. Detection device 122 contains a plurality of channels 170–174 which are used to detect and extract the envelope, or Doppler, of the harmonic components of the modulation signal. Channels 170 and 172 include mixers 148–150, respectively, for mixing the signal with a demodulation signal. Amplifiers 158–162 amplify the signal and deliver it to peak detectors 168–174 of range determining device 124, respectively, for producing a DC voltage signal of the amplified signals. Similarly, channel 174 includes amplifier 162 which delivers a signal to peak detector 164. The output of peak detectors 168–164 enter analog to digital converter 190 which converts the DC voltage signal to a digital signal. The amplitude at the output of analog to digital converter 190 is then measured by microprocessor 194 to determine if the amplitudes are greater than a predetermined value. If the amplitude exceeds the predetermined value, channels 170–174 are operating properly and the test is passed. Thus, mixers 148–150, amplifiers 158–162, peak detectors 168–164 and analog to digital converter 190 must be operating properly. If, however, any one of the amplitudes does not exceed the predetermined value, microprocessor 194 sends an error signal to indicator device 131 which may be a single light on the instrument panel or indicator 131b corresponding to detection unit 117 to alert the driver that the system, or detection unit 117 in particular, is not operating properly. A malfunction in amplifiers 158–162, peak detectors 168–164, analog to digital converter 190, mixer device 144 or mixers 148–150 will cause the indicator light to turn on.

While the amplitudes of analog to digital converter 190 are measured, counter device 202 counts a Doppler pulse, generated by comparator 196, to determine the frequency of the synthetic Doppler introduced into the system. Perturbing the modulation signal at a predetermined point in the amplitude of the modulation signal produces a Doppler shift of the same frequency every time. Thus, the frequency at the output of comparator 196 is compared to the predetermined frequency. If the frequency is not the same, microprocessor 194 sends an error message to indicator device 131 which may be a single light, or indicator 131b, to alert the driver that the system is not operating properly. If the output equals the predetermined value, the amplitude of the pulse is measured and compared to a predetermined value. If the amplitude exceeds the predetermined value, comparator 196 is operating normally.

Having determined that the frequency and bandwidth control circuit are functioning properly as well as the detector device and range determining device, it is necessary to determine that the antenna is operating properly. This is done by testing the RF unit. Setting the frequency outside the band setting of the antenna produces significant standing wave ratio (SWR). By adjusting the frequency in small increments from outside the band setting to within the band setting of the antenna, the SWR decreases. This decrease is represented by the variations in noise measurements. An increase in the variation between measurements necessarily suggests a decrease in the standing wave ratio produced by the reflected signal which is evidence that the signal is exiting the antenna, implying a proper match of the antenna to the system and proper operation of the antenna.

Figures 10, 12:
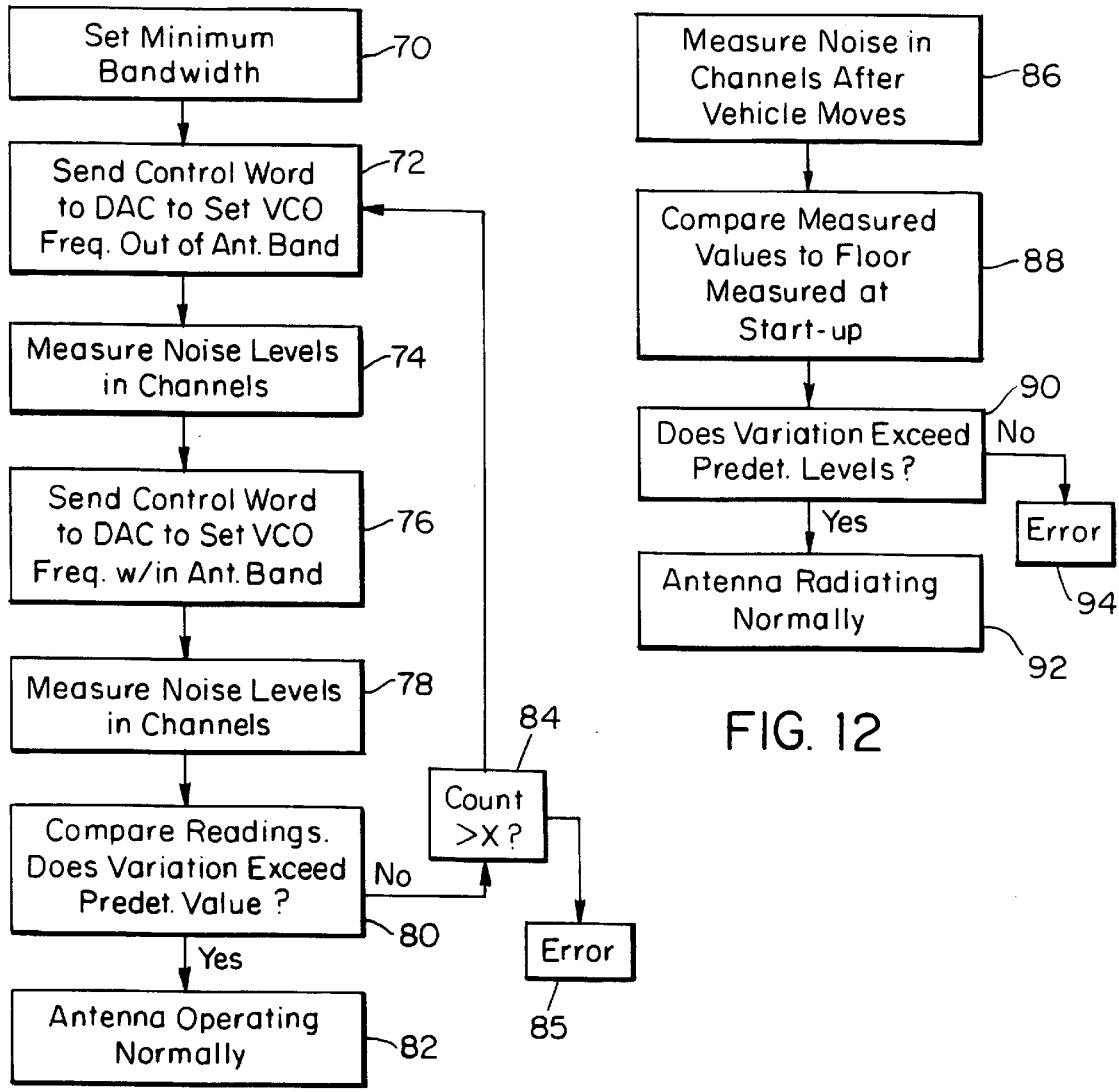
FIG. 10 is a flow chart of the RF unit self-test at start-up which determines the proper operation of the antenna of the anticipatory collision sensor system.
FIG. 12 is a flow chart of the overall system self-test used to verify proper illumination of objects by the antenna during normal operation of the automobile.

The minimum bandwidth is set, step 70, FIG. 10, as previously discussed. The microprocessor sends a control word to the digital to analog converter of the frequency control circuit, step 72, to adjust the voltage of the voltage controlled oscillator so that the voltage controlled oscillator frequency is outside of the band setting of the antenna. The noise levels in the channels are measured, step 74, and the microprocessor sends another control word to the frequency digital to analog converter to set the voltage controlled oscillator frequency within the band setting of the antenna, step 76. The noise levels in the channels are again measured, step 78, and the variations between the first measurement, step 74, and the second measurement, step 78, are compared to predetermined values, step 80. The predetermined values are based on the standing wave pattern set up between the antenna and the circulator output. The SWR of the antenna in-band is less than 1.5:1 while the out-of-band SWR is assumed to be higher than 3:1. If the variation does not exceed the predetermined value, the process is repeated, step 70 to step 80, each iteration adjusting the voltage controlled oscillator frequency by a small amount, less than 5 MHz. If too many iterations occur, step 84, an error message is sent by the microprocessor, step 85, to alert the driver that there is a malfunction. If, however, the variation does exceed the predetermined value, step 80, the antenna is operating normally, step 82.

Figure 11:
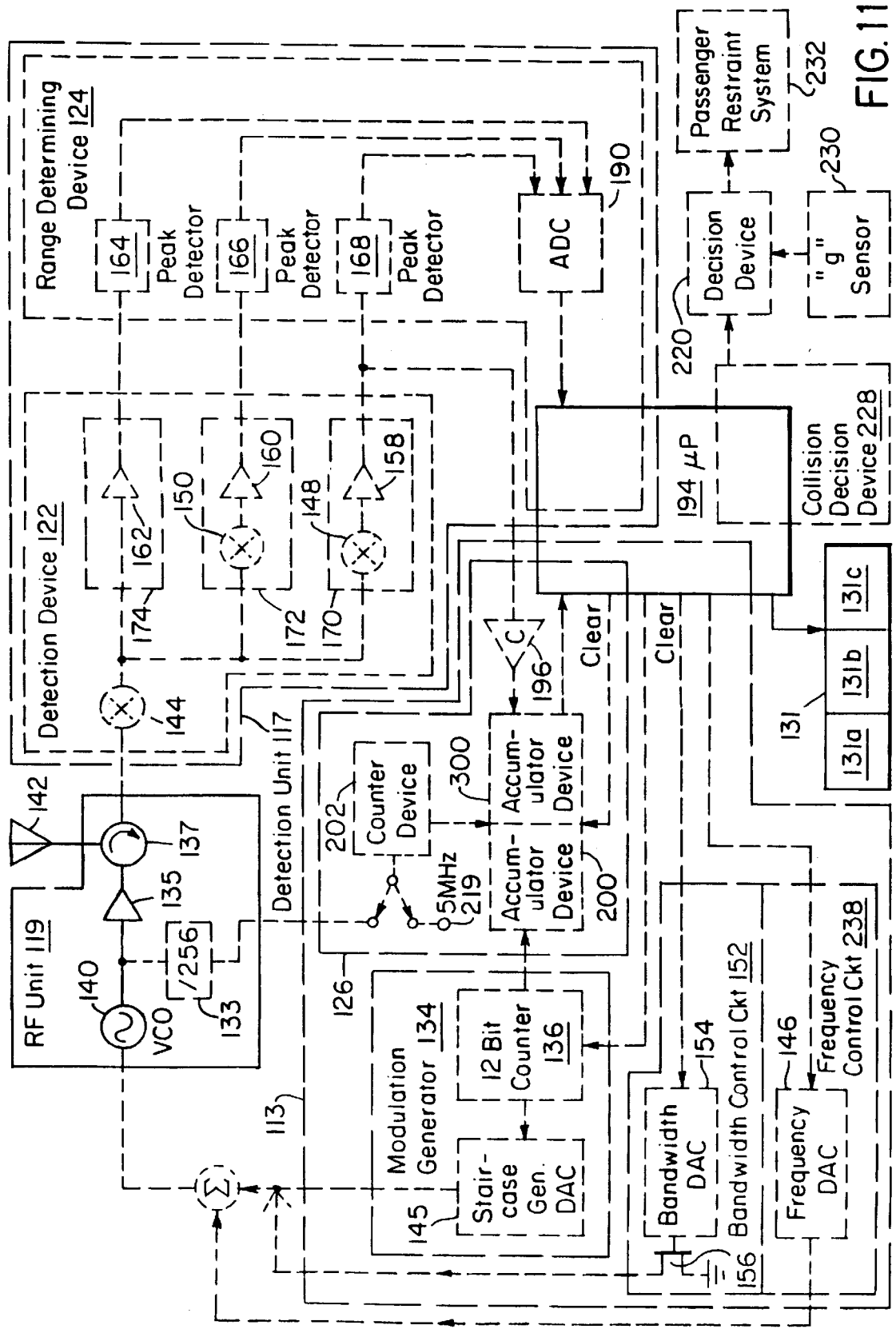
FIG. 11 is a detailed block diagram similar to FIG. 5 showing in full lines the components directly tested by the RF unit self-test of FIG. 10.

Voltage controlled oscillator 140, FIG. 11, produces a carrier signal, the frequency of which is responsive to the input voltage of voltage controlled oscillator 140. An amplifier 135, amplifies the output of voltage control oscillator 140 and delivers it to a circulator 137. Circulator 137 transmits the signal to antenna 142 to be transmitted or reflected. As discussed above, when voltage controlled oscillator 140 produces a frequency which is not within the band setting of antenna 142 a significant portion of the signal is reflected back into the system producing a significant SWR. The amplitude of the reflected signal is measured by microprocessor 194. The input voltage to voltage controlled oscillator 140 is then adjusted to produce a frequency which is within the band setting of antenna 142, and the amplitude of the reflected signal is again measured. If an xdB variation is obtained out of the antenna band setting and approximately ½ xdB is produced within the antenna band setting, the antenna frequency characteristics are normal. If the proper variations do not exceed the predetermined values, microprocessor 194 sends an error signal to indicator device 131 to alert the driver that there is a malfunction. Indicator device 131 may be a single light or an indicator 131*c* corresponding to RF unit 119 to alert the driver that the system, or RF unit 119 in particular, is not operating properly. A malfunction in voltage controlled oscillator 140, amplifier 135, circulator 137, or antenna 142 will cause the indicator light to turn on.

Up to this point, the entire anticipatory collision sensor system has been tested to determine the operational status of the components at start-up, prior to the vehicle moving. The entire time necessary to conduct the above diagnostic is typically less than a few hundred milliseconds. However, while it has been determined that the antenna is matched to the system and that in fact the antenna is radiating a signal, it is not known whether or not that signal is being blocked by an object in front of the antenna. Thus, it is necessary to perform an overall system self-test once the vehicle is in motion. This test is distinctly different from the previous diagnostic tests, as it is the only test that must be performed while the vehicle is in motion, in order to confirm that the antenna radiation pattern is not being blocked. As the vehicle moves, there is an increase in the noise levels within the system until the speed of the vehicle is well within the Doppler bandwidth. This increase and decrease is expected in stop and go traffic. The increase in noise while the vehicle is in motion significantly increases the floor noise, discussed above, due to bumps on the road surface which cause the suspension system to bounce and thus the antenna will correspondingly move closer to the ground. This relative movement of the antenna will be observed as an increase in the noise level on the "down-bounce" and a decrease in the noise level on the "up-bounce".

The noise levels in the channels are measured and compared to the noise floor measured at start-up, FIG. 5, as a reference. If the noise levels are the same then the antenna must be blocked. In normal operation, activity around the vehicle is detected by the anticipatory collision sensor system and is represented by increasing and decreasing noise levels in the channels. This presumes that the radiation pattern of the antenna is illuminating objects. In particular, detecting range bin crossings without confirmation indicates that the antenna is illuminating objects and therefore must not be blocked. If the noise in the channels falls within the same window as the noise at start-up yet is still varying from the noise floor, the fluctuations will be minimal and a lack of activity is ignored rather than perceived as an error in the operation of the system.

The noise in the channels is measured after the vehicle is in motion, step 86, FIG. 12. The measured values are compared, step 88, to the measured floor values, step 42, FIG. 5, obtained at start-up. The variations between the measured values, step 86, and the floor values obtained at start-up are compared to predetermined levels, step 90. If the variations between the two measurements do not exceed the predetermined levels then an error message, step 94, is sent by the microprocessor to alert the driver that the antenna is not radiating properly and that there is a malfunction. If, however, the variations in the noise measurements do exceed predetermined levels the antenna is radiating effectively, step 92.

Antenna 142, FIG. 13, transmits a modulated carrier signal and receives the reflected modulated carrier signal returning from various objects to include passing vehicles, telephone poles, and signs, as well as being reflected off the ground as the vehicle bounces due to irregularities in the road. The reflected signal is received by antenna 142 and is mixed with the modulated carrier signal by a mixer 144, as discussed in FIG. 9. The resulting signal is delivered to a plurality of channels also discussed in FIG. 9. The noise level in the channels is measured at the output of peak detectors 164, 166 and 168 via analog to digital converter 190 and compared to those obtained at start-up to determine that the antenna is in fact radiating. The detection of variations in the noise measurements verify the normal operation of mixers 148 and 150 as well as amplifiers 158, 160 and 162. If the detected variations do not exceed the predetermined levels, microprocessor 194 sends an error signal to indicator device 131 or indicator 131*c*.

The absence of an error signal indicates that all the units of the anticipatory collision sensor system are working properly and presupposes through inference that the microprocessor is working. However, without a test dedicated to determining the operational status of the microprocessor, absence of error signals could falsely indicate that the system is operating properly when in fact the microprocessor is malfunctioning. Thus, should microprocessor 194 fail to operate it is necessary that an error signal be generated. By providing a watchdog timer, it is possible to detect whether or not the microprocessor is functioning properly. The watchdog timer consists of a timer which waits for a reset signal from the microprocessor after a predetermined period of time known as a time-out period. If the watchdog timer does not receive a scheduled reset from the microprocessor, the watchdog timer sends an error signal to alert the driver that there is a malfunction. It is also critical that the voltage of the power supply which operate the anticipatory collision system does not fall below a certain level. If this happens, a brown out circuit shuts down the microprocessor until the power supply voltage is restored to the proper level.

Figure 14:
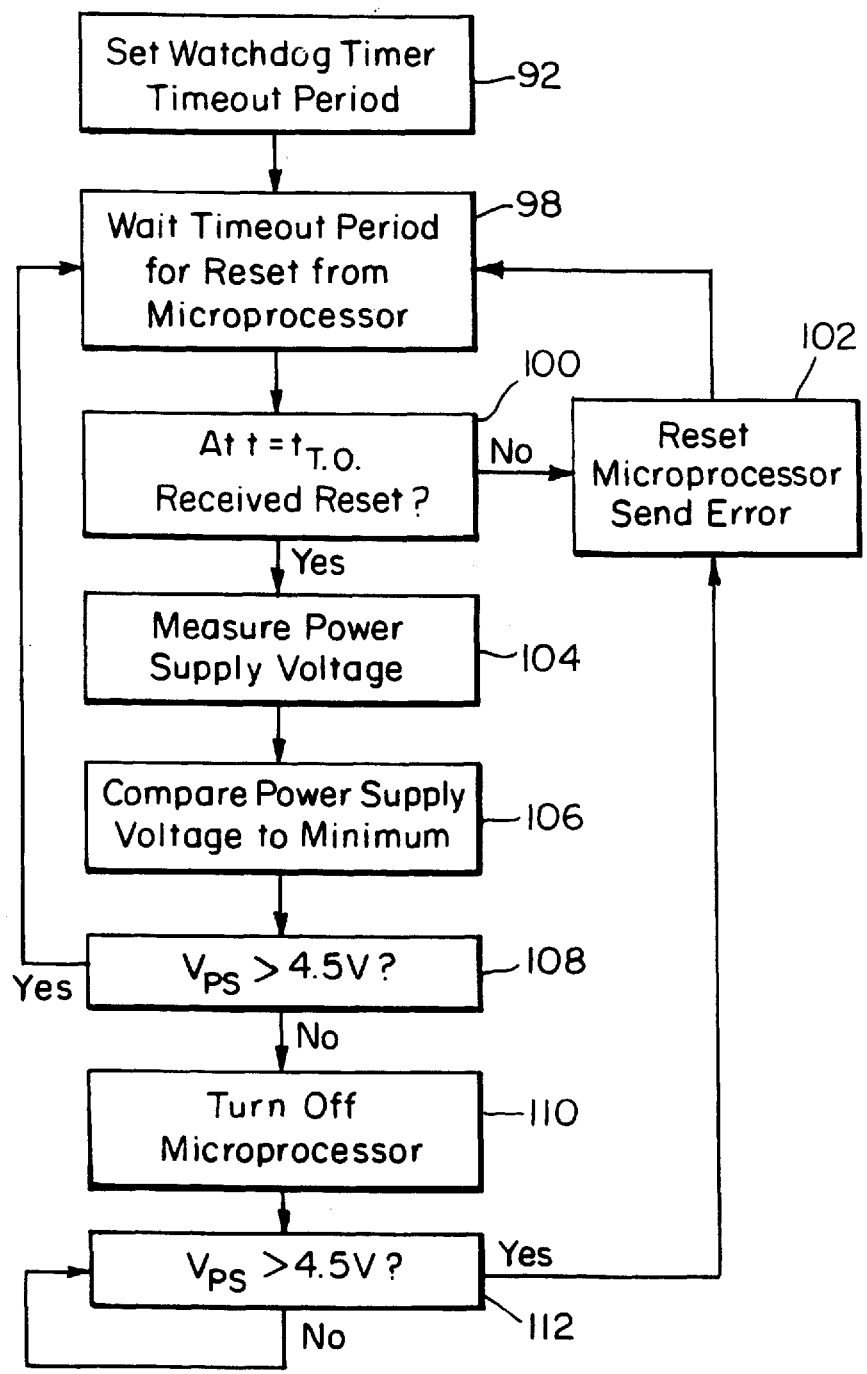
FIG. 14 is a flow chart of the watchdog timer and low voltage monitoring self-test which monitors normal operation of the microprocessor.

In operation the watchdog timer time-out period is set to a predetermined value, step 96, FIG. 14, typically less than 500 ms. The watchdog timer waits for a reset from microprocessor 194 within a predetermined period of time, step 98. At time t equal to the time-out period, if the watchdog timer has not been reset, step 100, the watchdog timer will reset the microprocessor, step 102, and again wait a time-out period for a reset from the microprocessor, step 98. If, however, the watchdog timer receives the reset, the voltage of the power supply is measured, step 104, and compared to the minimum voltage required to operate the system, step 106. If the measured voltage is greater than 4.5 volts, step 108, the system continues to wait for a reset from the microprocessor, step 98. However, if the power supply voltage is not greater than 4.5 volts, step 108, a brownout circuit turns off the microprocessor, step 110, until the power supply voltage is restored, step 112. Once the power supply voltage has returned to 4.5 volts the microprocessor is reset, step 102, and the watchdog timer waits for an interrupt, step 98, within the time-out period.

Thus, the anticipatory collision sensor system performs its own self-diagnostic independent of additional hardware or external connections using available noise signals and modified system signals.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A self-implementing, self-diagnostic system for an anticipatory collision sensor system for a vehicle comprising:

oscillator means for generating a carrier signal;

a modulation generator for generating a modulation signal for modulating said carrier signal;

means for selectively inhibiting said modulation signal to produce a synthetic Doppler shift;

a mixer device for mixing said carrier signal and said modulation signal to produce a modulated carrier signal;

a detection device, responsive to said synthetic Doppler shift, for detecting a synthetic Doppler signal induced by said means for inhibiting;

a measuring device, responsive to said synthetic Doppler signal, for measuring the amplitudes of said synthetic Doppler signal;

said measuring device including counting means, responsive to said synthetic Doppler signal, for determining the frequency of said synthetic Doppler signal;

first comparing means, responsive to said measuring means, for comparing said amplitudes to predetermined levels;

second comparing means, responsive to said frequency of said synthetic Doppler signal, for comparing said frequency to a predetermined value; and an indicating device, responsive to said first comparing means and said second comparing means, for indicating the operational status of said anticipatory collision sensor system.

2. The self-implementing, self-diagnostic system of claim 1 in which said detection device includes a plurality of channels for detecting said synthetic Doppler signal, each said channel including amplifier means for amplifying said synthetic Doppler signal.

3. The self-implementing, self-diagnostic system of claim 2 in which each said channel further includes mixing means for producing a demodulated carrier signal.

4. The self-implementing, self-diagnostic system of claim 3 in which each said channel further includes detector means for detecting the peak amplitude of said synthetic Doppler signal to produce a DC voltage signal for said synthetic Doppler signal.

5. The self-implementing, self-diagnostic system of claim 4 in which said range determining device includes an analog to digital convertor for converting said DC voltage signal to a digital signal.

6. The self-implementing, self-diagnostic system of claim 5 in which said measuring device includes a comparator device, responsive to said synthetic Doppler signal, for providing a Doppler pulse each time the amplitude of said synthetic Doppler signal exceeds a predetermined level.

7. A self-implementing, self-diagnostic system for an anticipatory collision sensor system for a vehicle comprising:

a voltage controlled oscillator for generating a carrier signal to be modulated having a predetermined frequency and bandwidth;

an adjustment device including a center frequency adjustment circuit for providing a voltage level to said voltage controlled oscillator;

a modulation generator for generating a modulation signal for modulating said carrier signal to produce a modulated carrier signal and a measurement signal synchronized with said modulation signal;

means for selectively minimizing said modulation signal for minimizing said bandwidth;

a measurement device including a counter device for selectively counting the pulses of said modulated carrier signal for a first predetermined period of time and counting the pulses of said carrier signal for a second predetermined period of time while said modulation signal is minimized and including a measurement circuit responsive to said measurement signal for defining said first predetermined period of time during which said modulated carrier pulses are counted and responsive to a timing signal for defining said second predetermined period of time during which said modulation signal is minimized for counting said carrier pulses;

said adjustment device being responsive to said measurement device, for varying the voltage applied to said voltage controlled oscillator to maintain said predetermined frequency of said carrier signal and being responsive to said measurement device for varying the voltage applied to said voltage controlled oscillator to maintain said predetermined bandwidth of said modulated carrier signal;

counting means, responsive to said adjustment device, for counting within a predetermined period of time the number of times said adjustment device has varied said voltage applied to said voltage controlled oscillator; and an indicating device, responsive to said counting means, for indicating the operational status of said adjustment device and said measurement device.

8. The self-implementing, self-diagnostic system of claim 7 in which said means for selectively minimizing includes a field effect transistor for attenuating said modulation signal.

9. The self-implementing, self-diagnostic system of claim 8 in which said adjustment device includes a voltage controlled device for controlling said voltage level at the input to said voltage controlled oscillator.

10. The self-implementing, self-diagnostic system of claim 9 in which said adjustment device further includes a digital to analog convertor means for operating said voltage controlled device.

11. A self-implementing, self-diagnostic system for an anticipatory collision sensor system for a vehicle comprising:

a voltage controlled oscillator for generating a signal to be modulated;

antenna means having a predetermined band setting for transmitting signals within said band setting;

a modulation generator for generating a modulation signal for modulating said carrier signal;

means for selectively minimizing said modulation signal to produce a minimized bandwidth in said carrier signal;

an adjustment device including a center frequency adjustment circuit for providing a voltage level to said voltage controlled oscillator;

first adjustment means for adjusting said voltage level to provide a center frequency which is outside of said band setting of said antenna means for producing a first standing wave ratio;

first noise measuring means, responsive to said first standing wave ratio, for measuring contemporaneous variations in said first standing wave ratio;

second adjustment means for adjusting said voltage level to provide a center frequency within said band setting;

second noise measuring means, responsive to said second standing wave ratio, for measuring contemporaneous variations in said second standing wave ratio;

comparing means responsive to said first noise measuring means and said second noise measuring means, for comparing said contemporaneous variations to predetermined levels; and an indicating device, responsive to said comparing means, for indicating the operational status of said antenna.

12. A self-implementing, self-diagnostic system for an anticipatory collision sensor system for a vehicle comprising:

radiation means for radiating a signal and receiving the reflected signal;

a detection device, responsive to said reflected signal, for detecting a noise signal in said reflected signal;

noise measuring means, responsive to said noise signal, for measuring contemporaneous variations in said noise signal;

comparing means for comparing said contemporaneous variations to predetermined noise levels; and an indicating device, responsive to said comparing means, for indicating the operational status of said radiation means.

13. The self-implementing, self-diagnostic system of claim 12 in which said detection device includes a plurality of channels for detecting said noise signal each said channel including amplifier means for amplifying said noise signal.

14. The self-implementing, self-diagnostic system of claim 13 in which each said channel further includes detector means for detecting the peak amplitude of said noise signal to produce a DC voltage signal for said noise signal.

15. The self-implementing, self-diagnostic system of claim 14 in which said detection device further includes an analog digital convertor for converting said DC voltage signal to a digital signal.

16. A self-implementing, self-diagnostic system for an anticipatory collision sensor system comprising:

a transducer device for transmitting a modulated carrier signal, and receiving the reflected modulated carrier signal from an object;

a detection device for detecting a Doppler shift in the reflected modulated carrier signal;

a range determining device for determining the instantaneous range of said object;

noise measuring means, responsive to said reflected signal, for measuring contemporaneous variations in the noise of said reflected signal;

comparing means for comparing said contemporaneous variations to predetermined noise levels; and an indicating device, responsive to said comparing means, for indicating the operational status of said radiation means.

17. The self-implementing, self-diagnostic system of claim 16 in which said detection device includes a plurality of channels for detecting said noise, each said channel including amplifier means for amplifying said noise.

18. The self-implementing, self-diagnostic system of claim 17 in which each said channel further includes detector means for detecting the peak amplitude of said noise to produce a DC voltage signal for said noise.

19. The self-implementing, self-diagnostic system of claim 18 in which said range determining device includes an analog digital convertor for converting said DC voltage signal to a digital signal.

20. A self-implementing, self-diagnostic system for an anticipatory collision sensor system comprising:

a transducer device for transmitting a modulated carrier signal and receiving the reflected modulated carrier signal from an object;

a detection device for detecting a plurality of Doppler shifted harmonic components in said reflected modulated carrier signal;

a range determining device including microprocessor means, responsive to the amplitudes of at least two equal harmonic components being equal, for determining the instantaneous range of said object;

a velocity measurement device, responsive to the frequency of said Doppler shifted harmonic components, for determining the relative instantaneous velocity of said object;

counting means, responsive to a clock signal, for producing a counter value;

said microprocessor means including reset means, responsive to said clock signal, for resetting said counter means after a predetermined period of time;

first reset means, responsive to said counting means, for resetting said microprocessor means when said counter value exceeds a predetermined value;

voltage measurement means, responsive to the operating voltage of said microprocessor means, for measuring the power supply voltage input to said microprocessor means;

second reset means, responsive to said voltage measurement means, for resetting said microprocessor means when said operational voltage falls below a predetermined level; and an indicating device, responsive to said voltage measurement means and said counter means, for indicating the operational status of said microprocessor means.

21. A self-implementing, self-diagnostic system for an anticipatory collision sensor system comprising:

a transducer device for transmitting a modulated carrier signal and receiving the reflected modulated carrier signal from an object;

a detection device for detecting a plurality of Doppler shifted harmonic components from said reflected modulated carrier signal;

a range determining device responsive to the amplitude of at least two of said harmonic components being equal for determining the instantaneous range of said object;

a velocity measurement device, responsive to the frequency of at least one of said harmonic components, for determining the relative, instantaneous velocity of said object;

an indicating device, responsive to at least one of said modulated carrier signal, said reflected modulated carrier signal, said amplitude, and said frequency, to indicate the condition of said system.

* * * * *